June 30, 1931. C. M. LAMB 1,812,052
METHOD OF MAKING CHAINS AND APPARATUS THEREFOR
Filed Sept. 28, 1927 10 Sheets-Sheet 2
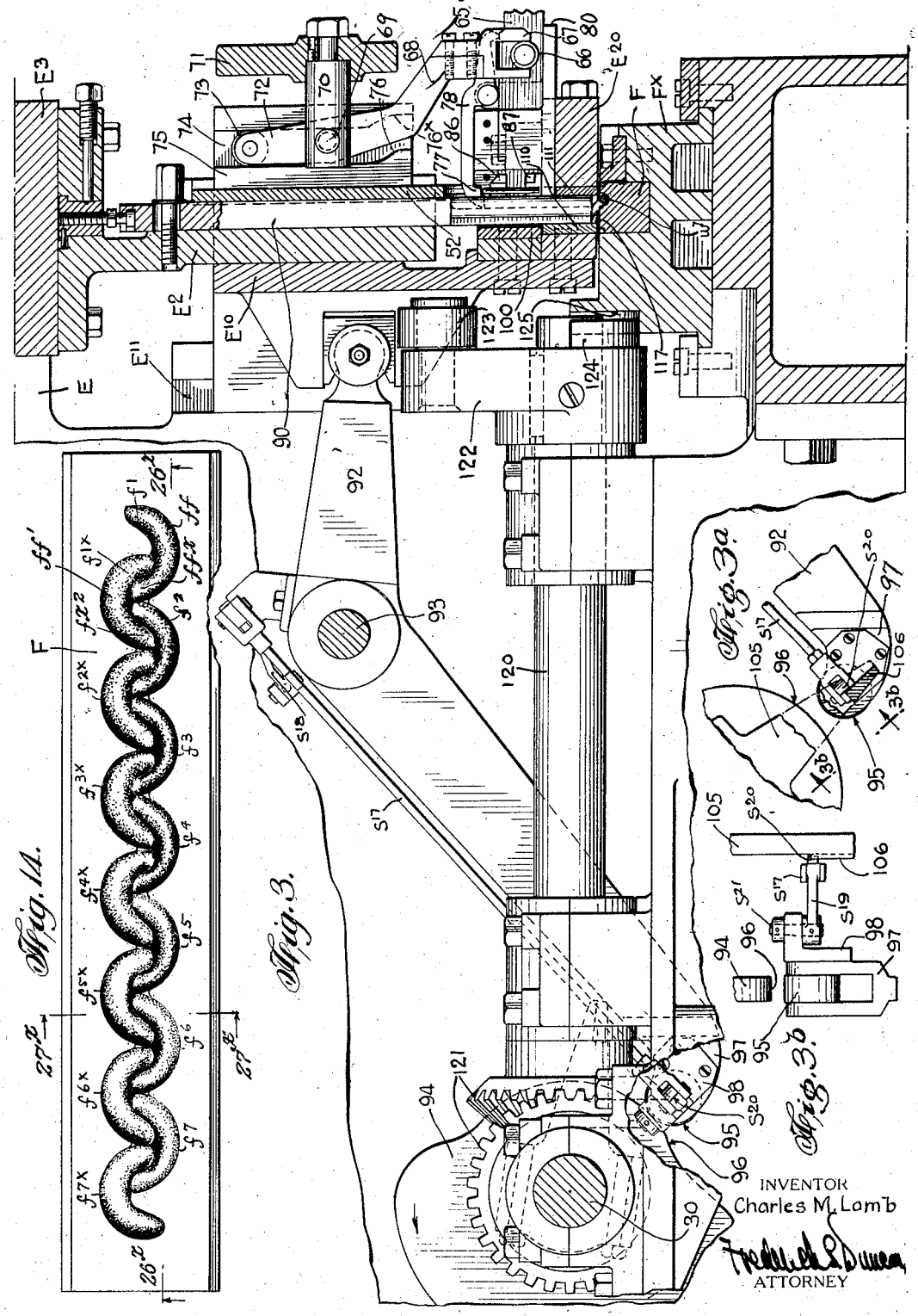
INVENTOR
Charles M. Lamb
ATTORNEY

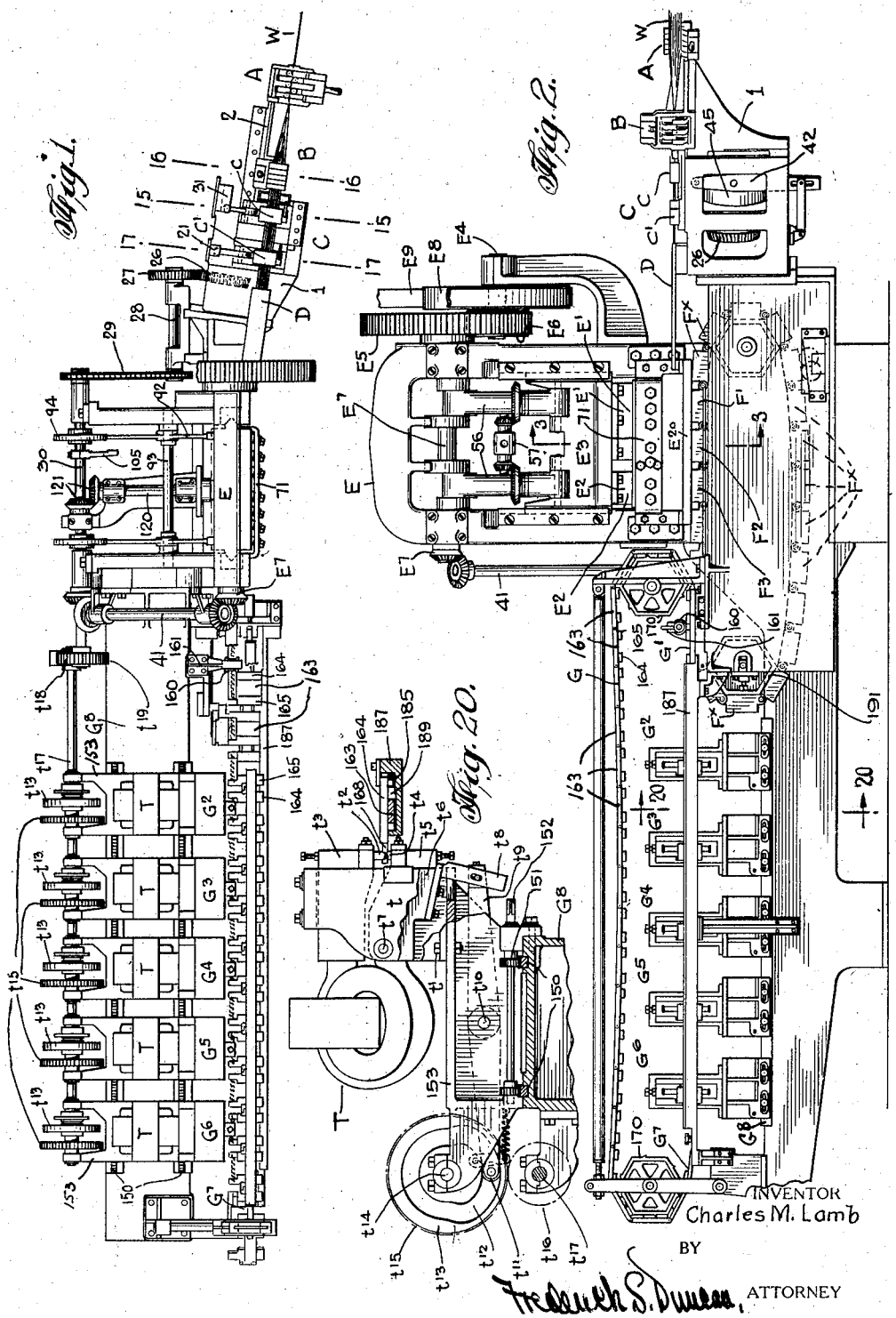

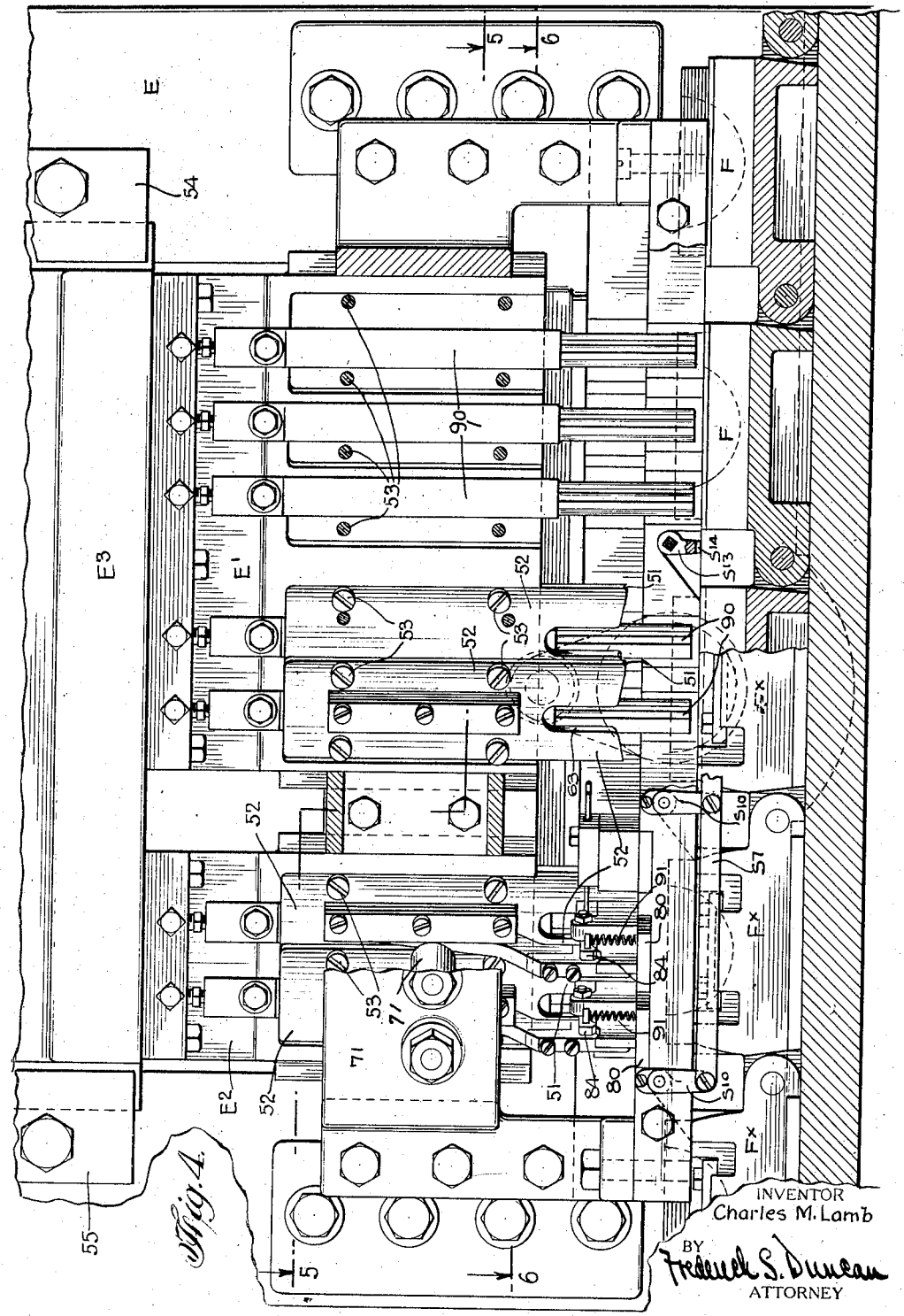

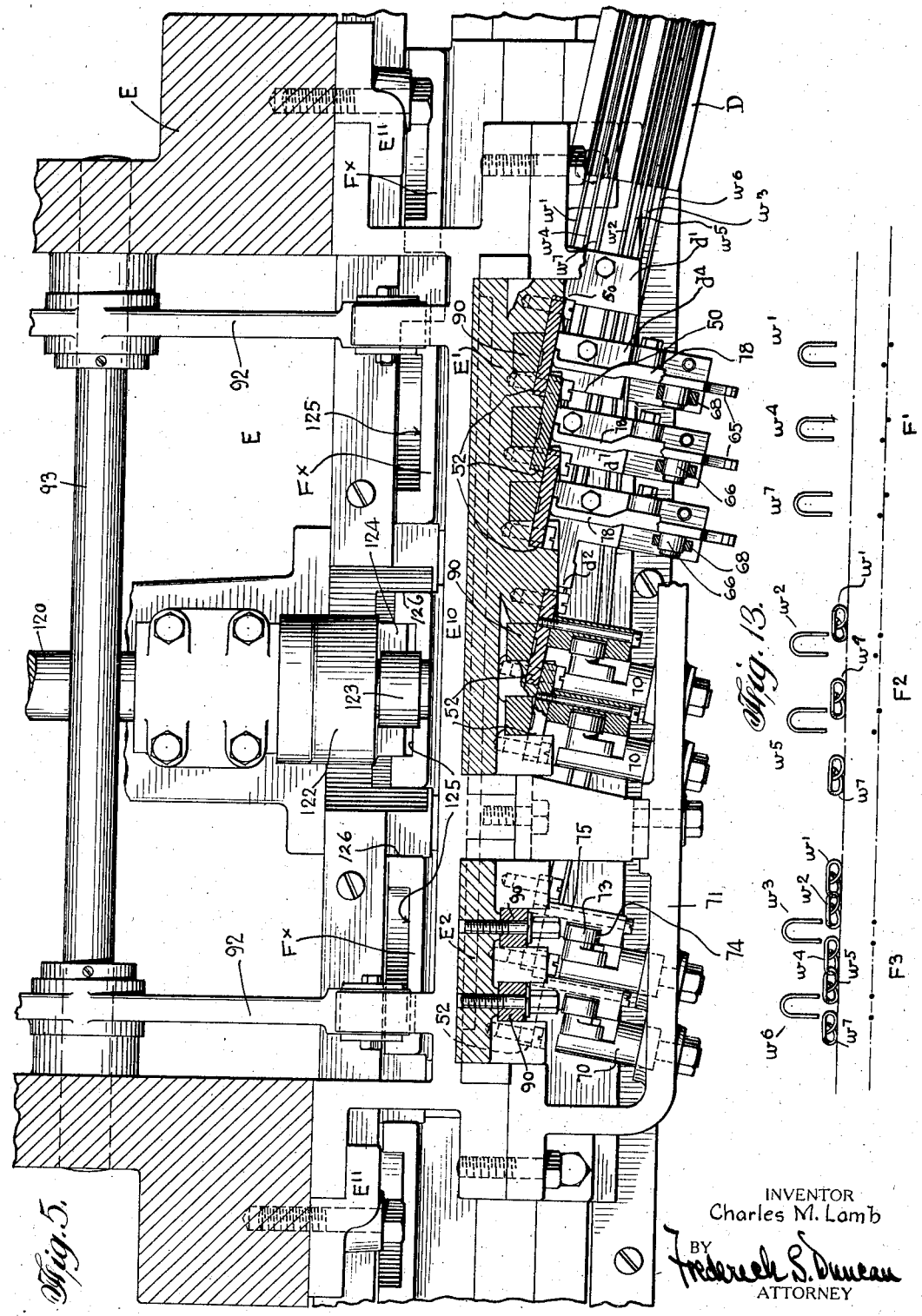

June 30, 1931. C. M. LAMB 1,812,052
METHOD OF MAKING CHAINS AND APPARATUS THEREFOR
Filed Sept. 28, 1927    10 Sheets-Sheet 5
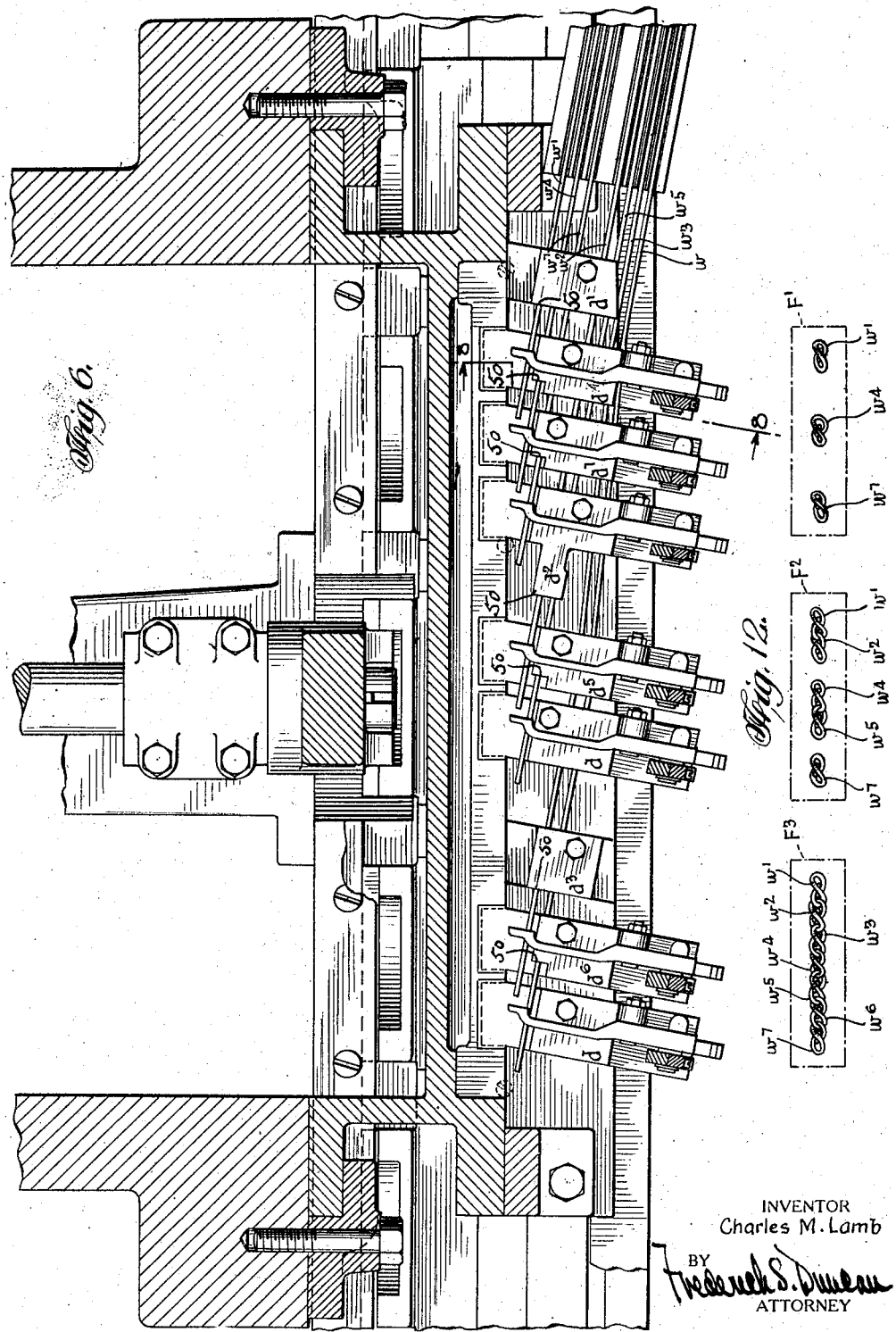
INVENTOR
Charles M. Lamb
BY
ATTORNEY June 30, 1931.  C. M. LAMB  1,812,052
METHOD OF MAKING CHAINS AND APPARATUS THEREFOR
Filed Sept. 28, 1927  10 Sheets-Sheet 6
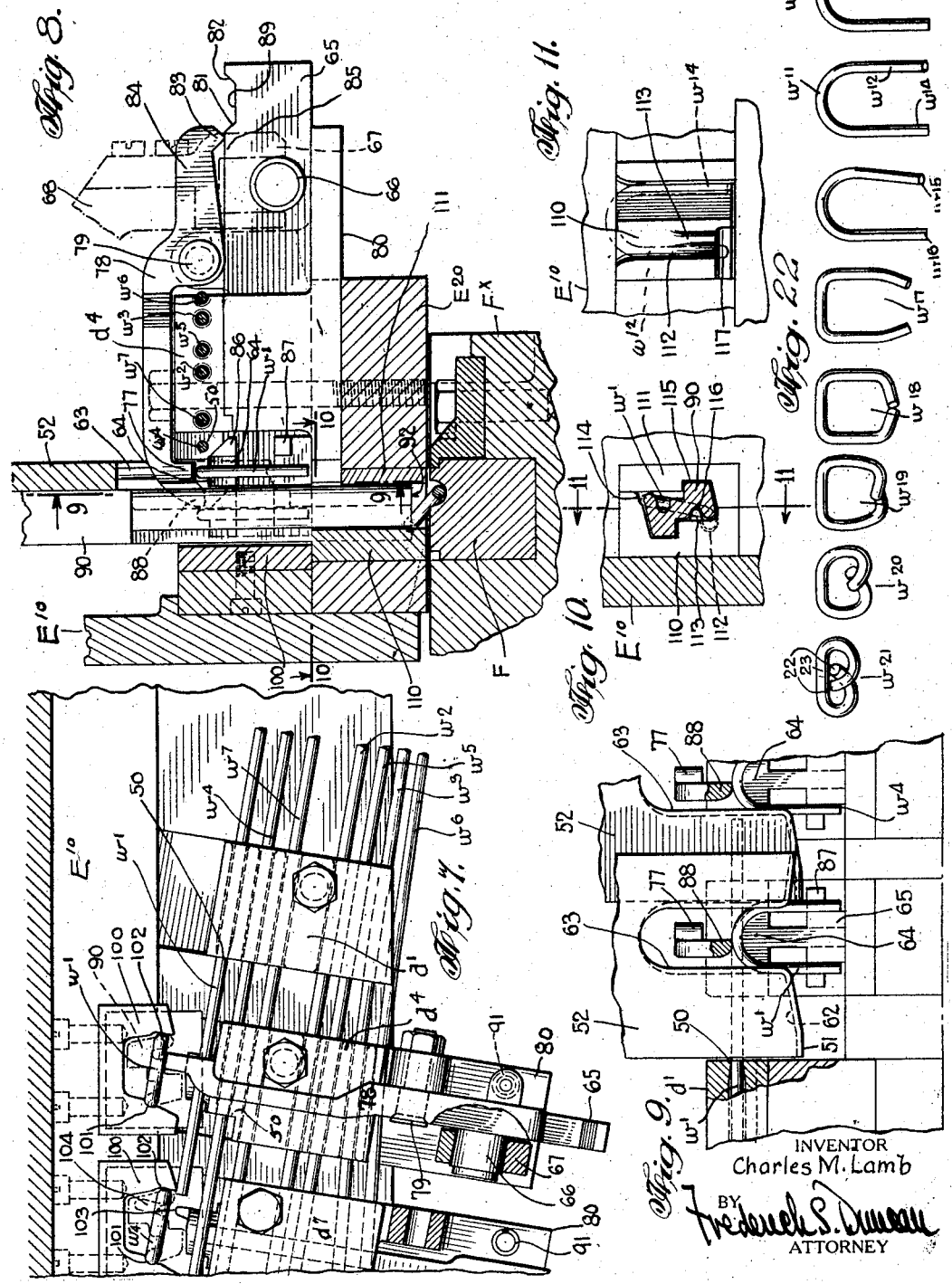
INVENTOR
Charles M. Lamb
BY
ATTORNEY

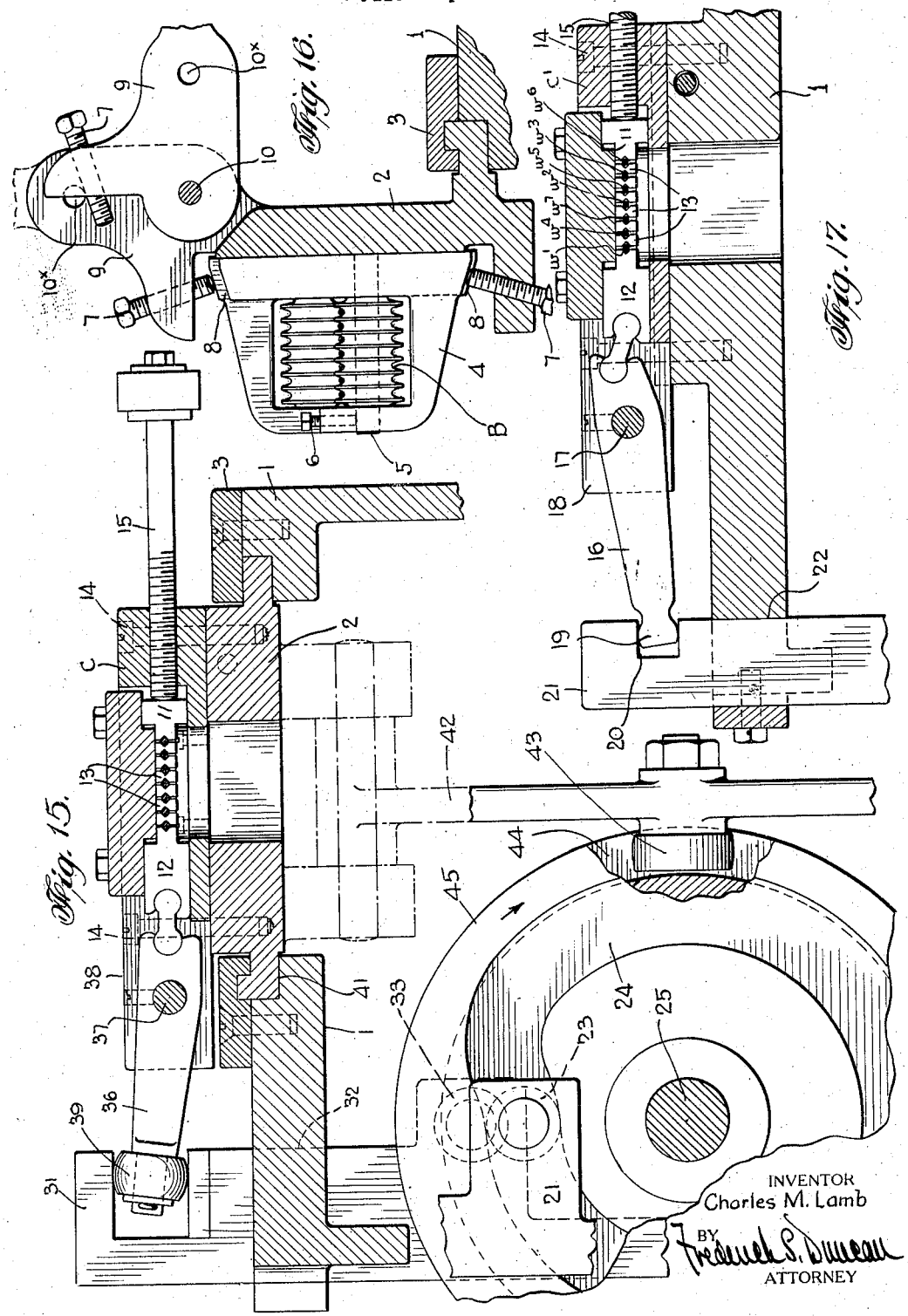

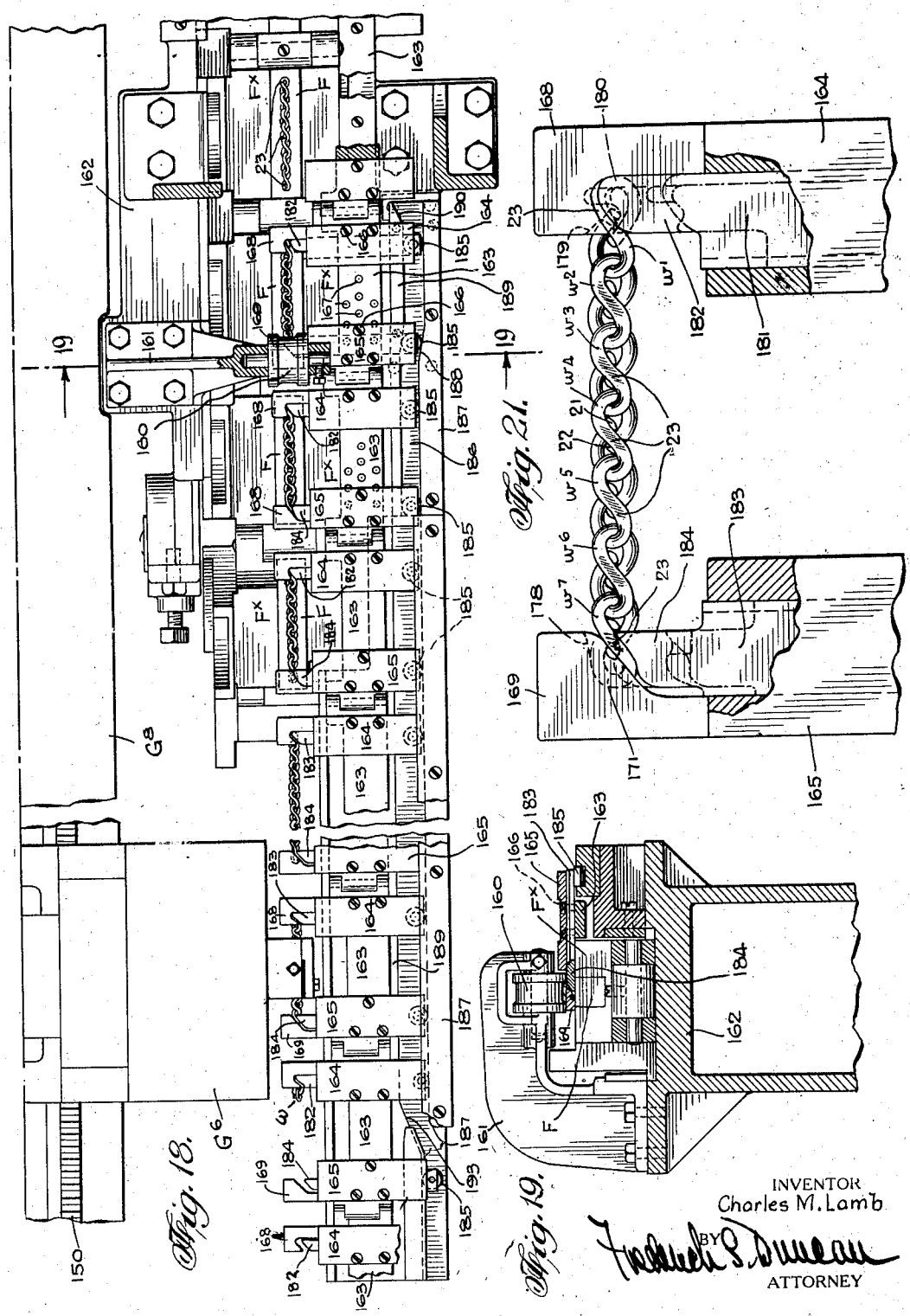

June 30, 1931. C. M. LAMB 1,812,052
METHOD OF MAKING CHAINS AND APPARATUS THEREFOR
Filed Sept. 28, 1927 10 Sheets-Sheet 9
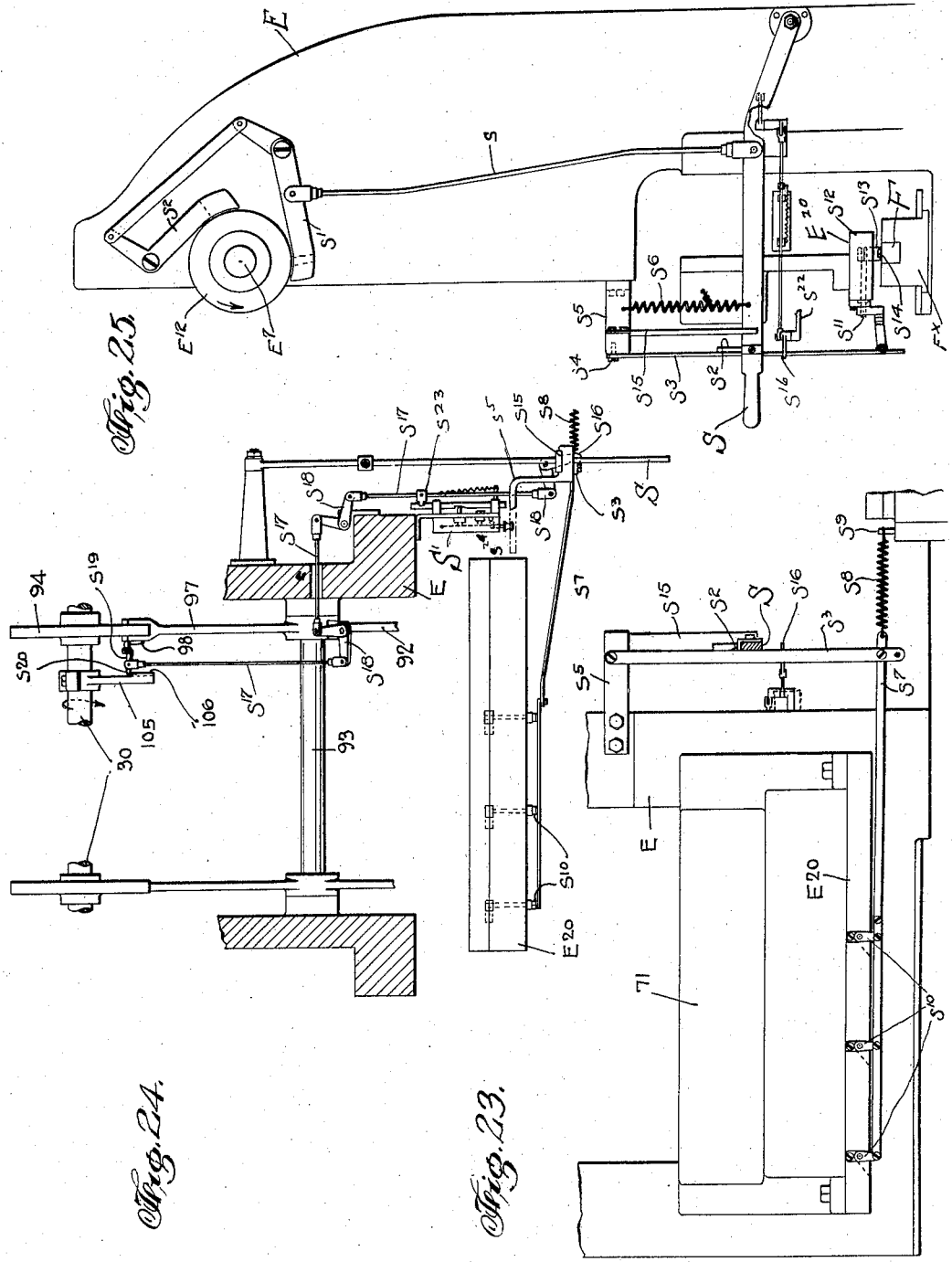
INVENTOR
Charles M. Lamb
BY
ATTORNEY

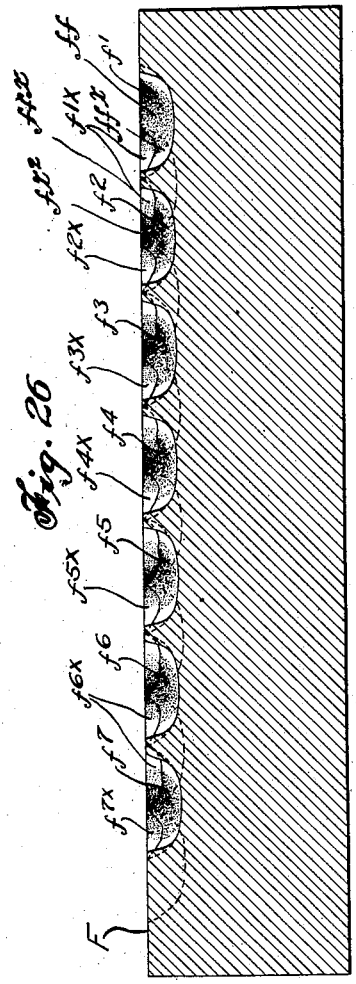
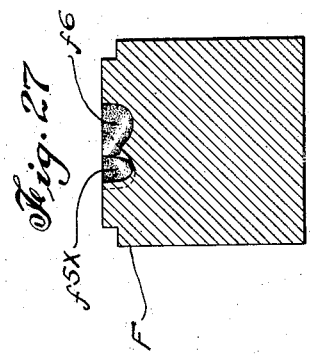
*INVENTOR.*
*Charles M. Lamb*
*ATTORNEY*

Patented June 30, 1931

1,812,052

UNITED STATES PATENT OFFICE

CHARLES M. LAMB, OF PASADENA, CALIFORNIA, ASSIGNOR TO AMERICAN CHAIN COMPANY, INC., A CORPORATION OF NEW YORK

METHOD OF MAKING CHAINS AND APPARATUS THEREFOR

Application filed September 28, 1927. Serial No. 222,462.

This invention relates to the art of bending and forming wire, and is of particular utility when employed in the formation of chains, such as the cross-chains used as anti-skid members in anti-skid devices for vehicle wheels, although I contemplate the utilization of my improvements in any field for which they are adapted by their nature.

The general object of the invention is to provide a process for operating upon an extended supply of wire, utilizing preferably the supply of wire in the form of coils or drifts as they come from the mill, my improvements providing for operating simultaneously upon a plurality of wires each derived from one such drift, and the invention provides for straightening the wires respectively, then severing the wires into parts of a convenient length to serve as blanks for the formation of individual links in a chain; then operating simultaneously upon several such blanks to form the blanks into links, this step of forming several secondary links being preferably accomplished in such a manner that two or more links are formed in linking relation with earlier formed links so as to constitute one or more groups or elements of each chain; then forming simultaneously a third series of links so spaced and related to the groups of links already formed as to complete the connection of the aforesaid groups or elements to constitute a chain having the desired number of links, according to the size and purpose of the particular type of chain under formation; then performing a welding operation upon a series of the chains formed as above, and preferably carrying on simultaneously a series of such welding operations concurrently with the formation of the chain links so that the operations of link-forming and welding constitute steps in a continuous process which results in delivery successively of complete sections of chain each adapted to serve, for example, as a cross chain in an anti-skid tire chain of preferably conventional form, or of any desired type, the cross-chains thus delivered being ready for assembly with the side chains usually provided in the formation of such tire chains.

A cognate object of the invention is to provide an organized machine having instrumentalities adapted each to carry out one or more of the steps of the aforesaid process, and so timed in their operation that the supplies of wire are straightened, formed into groups of links, and the groups of links connected by the formation of the necessary interconnecting links, and the sections of chain thus formed are operated upon by welding instrumentalities, in pursuance of the process, and without the delays or dwells in operation which are ordinarily characteristic of the formation of such chains when different operations are performed in separate machines.

A further object of the invention is to provide a process and means for fabricating complete cross-chain units without the waste of stock and loss of time ordinarily due to the formation of such cross chains when the latter are made from a continuous length of chain from which certain of the links have to be cut when the extended chain is divided up to form the individual cross chains.

An object of the invention which is in part contributory to accomplishment of the above objects, is to provide a novel process of making individual chain links of the type characterized by a length of wire having its ends bent toward its central portion and thus forming loops at each side of the central portion, the novel process comprising the steps of bending each of said lengths of stock into the form of a staple and then forcing each staple into a die having adjacent cavities adapted to bend the legs of the staple around toward each other in such a manner as to cause the ends of the legs to cross each other and each to enter the eye or loop formed by an earlier stage of the bending operation, the completed link being formed by a single, continuous forcing of the staple into the cavities of the die.

Accordingly the invention has also for an object the provision of a die with cavities devised to form each staple in the above manner, and the provision of a mechanism including guides, forming blocks and plungers co-operating with the die to make the complete individual links and further adapted to fabricate a chain in which the links are of the above type and are made in interlinking relation, several of the mechanisms being organized into a machine so that one or more of the constituent mechanisms may be making separate links at spaced portions of a die, while other mechanisms are simultaneously making interlinking links.

The invention has for still another object the provision of special mechanism for transferring successively to welding mechanism each completed chain as it emerges from the forming mechanism, the transfer mechanism including means for grasping each section of chain by its end links and carrying it through a series of welding units, in such a manner that each link of the chain is presented in turn to one of the welding units to be welded and so that after the links have all been welded, the completed, welded chain is discharged.

The invention provides also for stopping the machine automatically when any link projects unduly from its die, and when bits of wire stock or other extraneous objects get into a position to injure or interfere with the proper operation of the forming mechanism, and also when the parts of the forming mechanism are out of their proper cooperative positions.

The above and other features of the invention are illustrated and described fully in the accompanying drawings and specification and are pointed out in the claims.

In the drawings,

Fig. 1 is a view in plan of a chain-forming machine in the construction of which my improvements have been embodied, and which is organized to carry into effect the process forming the subject of this invention.

Fig. 2 is a view of the same in front elevation.

Fig. 3 is an enlarged detail view in vertical section, taken on the line 3—3 of Fig. 2.

Fig. 3a is a fragmentary, detail view showing parts of the mechanism of Fig. 3 in another position, and Fig. 3b is a projection of the parts shown in Fig. 3a.

Fig. 4 is an enlarged fragmentary detail view in front elevation, partly in section.

Fig. 5 is a detail view in horizontal section on the irregular line 5—5 of Fig. 4.

Fig. 6 is a similar view on the line 6—6 of Fig. 4.

Fig. 7 is a fragmentary detail view, on an enlarged scale, in plan, with parts shown in section, taken near the right-hand side of Fig. 6.

Fig. 8 is a vertical sectional detail on the line 8—8 of Fig. 6.

Fig. 9 is a transverse vertical section on the line 9—9 of Fig. 8.

Fig. 10 is a framentary sectional detail, taken on the line 10—10 of Fig. 8.

Fig. 11 is a fragmentary detail view in elevation looking in the direction of the line 11 in Fig. 10, part of the structure being omitted.

Fig. 12 is a view of a diagrammatic character showing three steps in the formation of a cross-chain according to the invention.

Fig. 13 is a similar diagrammatic view in elevation showing three steps in the formation of such a cross-chain.

Fig. 14 is a plan view of a now-preferred form of die used in the formation of chain in carrying out the process of this invention.

Fig. 15 is a fragmentary vertical sectional view, on an enlarged scale, taken on the line 15—15 of Fig. 1.

Fig. 16 is a similar view on the line 16—16 of Fig. 1.

Fig. 17 is a similar view on the line 17—17 of Fig. 1.

Fig. 18 is an enlarged detail view in plan, partly in section of the transfer and welding mechanism shown in Fig. 2.

Fig. 19 is a vertical section on the line 19—19 of Fig. 18.

Fig. 20 is a fragmentary vertical sectional detail view, upon an enlarged scale, taken upon the line 20—20 of Fig. 2.

Fig. 21 is a fragmentary detail view upon an enlarged scale taken from Fig. 18 and showing a completed chain ready for welding.

Fig. 22 is a group view showing different stages in the formation of a link.

Fig. 23 is a detail view in front elevation of an automatic stop mechanism adapted for use with the forming mechanism.

Fig. 24 is a detail view of the same taken in horizontal section across the forming mechanism; and Fig. 25 shows the stop mechanism in side elevation, these views being of a somewhat diagrammatic character.

Fig. 26 is a transverse, sectional view on the line 26x—26x of Fig. 14.

Fig. 27 is a similar view on the line 27x—27x of Fig. 14.

In carrying the invention into effect, the operations which characterize the improved process of forming such articles as cross-chains for anti-skid devices for automobile and other vehicle wheels are preferably carried out in the following order, and by mechanisms which will be designated generally by alphabetical reference characters, a more detailed description of the several mechanisms being given later in this specification.

In pursuance of the invention, several wires, W, are supplied, preferably from any suitable source such as the reels or drifts which come from the wire mill, and as such drifts are of well known form, they are not illustrated herein, the reference character W designating a group of wires of any suitable number and material, seven being shown in the instance illustrated, each wire serving as stock from which is to be formed a particular series of links which in due course take their place in the assembled cross-chains made according to the improved process carried into effect by the machine under description. In order to permit ready identification of these wires and the parts made therefrom during the different stages of operation thereupon, the wires and parts, and also the links formed therefrom are designated throughout the specification by the reference characters $w^1$, $w^2$, $w^3$, $w^4$, $w^5$, $w^6$, and $w^7$.

The entire group of stock wires W is preferably first subjected to a straightening operation, which may be performed by any suitable means, such as the sets of rolls indicated generally at the right-hand side of Figs. 1 and 2 by the reference characters A and B, such straightening mechanism being of well-known character, not requiring special description at this time except to say that the straightening devices in the set A comprise rolls mounted with vertical axes, while the set B comprises rolls mounted with their axes horizontal.

From these straightening devices the wires are fed in parallel horizontal relation by a mechanism C through guides D to the forming mechanism E. This mechanism severs at each stroke a part from each of the seven stock wires and during a continuation of the same stroke forms each of the seven parts into a staple of the form shown in Fig. 13, where the staples are designated by the reference characters $w^1$, to $w^7$ inclusive, all these staples being formed as already indicated by a single stroke of the forming mechanism. The above severing operation and formation of staples is completed during the early part of each stroke. During the remainder of each stroke the staples already formed in an earlier stroke are forced into dies to form the staples into links.

The preferred form of dies is illustrated by the die shown in Fig. 14, bearing the reference character F. These dies may be, and preferably are, identical in form and will be described more in detail hereinafter. The dies F are preferably carried by die-blocks $F^x$, which are linked together in the form of an endless belt or conveyer adapted to run beneath the forming mechanism E so as to present the dies successively in position beneath the forming tools, as indicated in Fig. 2, where the reference characters $F^1$, $F^2$, and $F^3$ indicate the positions of the dies which at any given time are ready to cooperate with the forming tools. After each stroke of the mechanism E, the dies are moved to the left, one step, so that during the next stroke the die which has occupied the position $F^1$ will occupy that lettered $F^2$, and after that stroke the said die is moved to the position $F^3$ and so on. Thus each die occupies three separate positions during each cycle of operations necessary to complete a cross-chain, and at any given time there are three dies in position, so that three strokes of the forming mechanism are required to carry out the cycle necessary to complete each cross-chain.

Briefly stated, the first stroke of a cycle results in the formation of the three links designated $w^1$, $w^4$, and $w^7$ at the right-hand side of Fig. 12. During the same stroke the die in the position $F^2$ is forming the links $w^2$ and $w^5$, the link $w^2$ being formed in such a manner as to inter-link with the link $w^1$, and link $w^5$ being formed in such a manner as to inter-link with the link $w^4$, it being understood that the links $w^1$, $w^4$ and $w^7$ have been carried over from the position $F^1$ to $F^2$ by feeding movement of the die-block conveyer. Prior to the third stroke of the cycle, the die-block conveyer moves another step, carrying into the position $F^3$ the die with the links $w^1$, $w^2$, $w^4$, $w^5$, and $w^7$, and while in the position $F^3$ the chain is completed by formation of links $w^3$, $w^6$, these links being formed in linking relation with the already formed groups of links, joining the link $w^2$ to the link $w^4$ and joining the link $w^5$ to the link $w^7$, the completed chain being shown in its position on the die at the left-hand side of Fig. 12.

The next operation performed on the cross-chains is to weld the links, and for this operation the cross chains are respectively transferred in succession from the dies F to an endless belt G, which receives the cross-chains from the dies at a region where the conveyer G runs in juxtaposition with the die-block conveyer, being superimposed above the latter for a short portion of its run, from which region the lower part of the conveyer G runs toward the left, as indicated in Fig. 2, through a series of welding units designated by reference characters $G^2$ to $G^6$ inclusive, each welding unit acting to weld one of the links, the head $G^2$ operating upon the link $w^2$ in each cross-chain, while the unit $G^3$ operates upon the link $w^3$ and the unit $G^4$ operates upon the link $w^4$ and so on. Only five welding units are shown, in the instance illustrated, for the reason that of the seven links of which each cross-chain is composed, only five links are required to be welded, the end links $w^1$ and $w^7$ being left without welding, these links serving as the links by which each cross-chain is connected to the side chains of the anti-skid tire chain with which they are to be incorporated eventually, and these end links are not subjected to the same wear by contact with the road and therefore need not ordinarily be welded. It will be understood, however, that provision may be made for welding these links or any additional links of which any desired type of cross-chain or similar chain may be composed.

After passing from the last of the welding heads G⁶, the cross-chains are discharged by the conveyer at approximately the region G⁷, thus completing the operation of the machine in carrying out the process, considered generally.

Passing now to a more particular description of the component mechanisms of the machine, in the order in which they perform the respective operations which characterize the process, the first in order to be described is the

*Wire straightening and feeding mechanism*

As already indicated, any suitable form of mechanism may be adopted for this purpose, and as one convenient form of mechanism, there is shown at A a set of straightening rolls with vertical axes and at B a similar set of rolls with horizontal axes. The latter set is shown in detail in the vertical sectional view in Fig. 16, in which is illustrated suitable means for supporting the straightening rolls in adjusted position relatively to the portion 1 of the base by which they are carried. Briefly described, the supporting means comprises a slide 2 mounted adjustably in slideways 3 upon the frame portion 1, the slide 2 being adapted to support a set of journal boxes 4, each of which carries the axis 5 for one set of rolls, the axes being held in place by set screws 6, and each box is held against the upright portion of the box frame on the slide 2 by means of set screws 7 preferably arranged at an angle and engaged with beveled portions 8 of the box in order to cause the latter to bear firmly against the slide 2. To permit ready removal of the boxes 4, the upper set screws 7 are shown as mounted on a bell crank lever or levers 9 which can be tilted back upon an axis 10 to clear the box for removal from the straightening mechanism B. Holes 10ˣ are provided through which a retaining pin or bolt may pass to hold the levers in operative vertical position.

The stock wires $w^1$–$w^7$ inclusive pass from the straightening mechanism in a horizontal plane to feeding mechanism C which comprises a plurality of clamping devices $c$ and $c^1$, of which the former is mounted to reciprocate in the line of feeding movement while the latter occupies a fixed position in the path of feed, means being provided to clamp the wires $w^1$–$w^7$ and to release them, intermittently, the clamp $c$ being operated to grip the wires as they emerge from the rolls B and to force them lengthwise through the clamping device $c^1$, while the latter is released, and the clamping device $c^1$ gripping the wires and holding them when the clamping device $c$ releases them and is returned for a fresh supply, the return of the clamp $c$ being accomplished while the forming operations are proceeding.

The general structure of the clamping devices $c$ and $c^1$ may be, and preferably is similar, and so far as possible the now-preferred form of structure will be described with the use of reference characters which designate corresponding parts in the two devices. Thus, in each device the clamping portion proper comprises end members 11 and 12 (see Figs. 15 and 17) of which the latter has a grooved face engaging the stock wire $w^1$, while the former has a similar grooved face engaging the stock wire $w^6$, there being also a series of grooved spacing members 13 suitable for engagement with the remaining stock wires $w^2$ to $w^6$ inclusive, when there are seven stock wires, or a proper number of spacers for any desired number of stock wires.

The clamping members just described are fitted respectively within the blocks which bear the reference characters $c$ and $c^1$ respectively, the block $c^1$ being bolted at 14 directly upon the frame bracket 1 and the block $c$ being bolted at 14 to the slide 2 which slides in the ways 3 formed on the base part 1, and each clamping device has an abutment screw 15 to permit the position of the end member 11 to be adjusted and maintained. The end member 12 in each instance is movable transversely in the plane of the wires, being arranged for retraction to release the wires as indicated in Fig. 17 and being capable of forward movement to clamp the wires as indicated in Fig. 15.

As a convenient form of device for effecting this clamping and releasing reciprocation there is shown for the fixed clamp $c^1$ a lever 16 upon an axis 17 carried by an extension 18 of the block $c^1$, the lever having an operating head 19 entering a slot 20 in a vertical slide 21 mounted in a slideway 22 provided in the frame part 1, vertical movement of this slide being accomplished by the operation of an anti-friction roller 23 mounted upon the slide and entering a face cam groove 24 upon a cam 45 mounted on a shaft 25 connected by bevelled gears 26 and 27 (see Fig. 1), and by a shaft 28 and link belt 29 with a shaft 30 which is geared back through a shaft 41, to the crank shaft E⁷ of the forming head. A similar vertical slide 31 mounted at 32 in the bracket 1 operates a lever 36 upon an axis 37 carried by an extension 38 of the block $c$ in order to reciprocate the member 12 of the clamp $c$, the slide 31 having a roller 33 entering a face-cam groove on the other side of cam cylinder 45.

As hereinbefore mentioned, the clamp $c$ is adapted to have a sliding movement in the line of feed of the wires $w^1$—$w^7$, and to effect the sliding movement in perfect timed relation with the other instrumentalities of the machine the slide 2 is operated by cam 45 through a lever 42 and an anti-friction roller 43 which enters a peripheral cam groove 44 upon the cam cylinder 45 (see Fig. 15).

To accommodate the movement of the lever 36 with the slide 2, the lever 36 has an anti-friction roller 39.

It is to be noted that the feeding clamp $c$ is mounted on the same slide 2 with the straightening sets A and B, and that the straightening operation is performed by the action of the straightening sets as the movement of slide 2 carries them toward the right along a fresh portion of the stock wires, as yet unstraightened, while the previously straightened portions of wire are held by clamp $c^1$.

The clamp $c^1$ is actuated automatically as above described, but if it be desired to set the clamp manually at any time, this may be done by setting forward the abutment screw 15. The clamp $c^1$ will desirably be set whenever it is desired to prevent feeding of the wires into the forming head, even though the feeding clamp $c$ be in release, for the straightening sets A and B will tend to cause lengthwise movements of the wires by virtue of their movement with slide 2, at all times even when the machine is being turned over by hand, but by setting the clamp $c^1$ upon the wires they will be held against such adventitious movements and the straightening sets will simply move to and fro along the wires.

When the feeding mechanism is operating normally, the clamp $c$ feeds the stock wires $w^1$—$w^7$ through a guide D, which is preferably grooved as shown in Fig. 5 to maintain the stock wires in desirably spaced relation and in their straightened form, directing them toward the forming head E, the now preferred construction of which will now be described:

*Stock severing and forming mechanism*

The next operation characteristic of the process is that of severing, from the stock wires $w^1$—$w^7$, parts suitable for the formation of the blanks or staples, the form of which is shown in Fig. 13; and any suitable mechanism may be provided for this purpose. As one convenient form of mechanism, the stock wires are fed over stationary shear members $d^1$—$d^7$ (see Fig. 6) there being one of these stationary shear members for each stock wire, although not all of the shear members need be formed as a separate member, and in fact the shear members $d^2$, $d^4$, $d^5$, $d^6$ and $d^7$ are preferably formed as part of cover plates upon certain of the wire guides to save space. In cooperation with the stationary shear members there is provided a corresponding series of movable shear members 51 (see Fig. 4) the movable shear in each instance forming part of a vertical reciprocating plunger 52 bolted at 53 upon one of two cross heads $E^1$ and $E^2$ which are respectively bolted in depending position upon a main cross head $E^3$ which slides in ways 54 and 55 upon the over-head structure of the forming mechanism E. The slide $E^1$ carries five of the plungers and the head $E^2$ carries two of the plungers, this division being adopted merely by way of convenience in arrangement of these parts, and primarily to permit the severing and forming devices to be arranged in groups so that they will not interfere with each other's operation. For this purpose also the stock wires are led-in preferably at substantially the angle shown in Fig. 5, the guide D being suitably positioned for that purpose, and subsidiary guideways in the shear members $d^1$—$d^7$ being provided where needed to afford the desired direction to the stock wires. The main cross-head $E^3$ is caused to reciprocate vertically by connecting rods 56 operated by the crank shaft $E^7$ connected with the main driving shaft $E^4$ by gears $E^5$ and $E^6$, the main driving shaft receiving its power from any suitable source as by means of a pulley $E^8$ and a belt $E^9$ running to a suitable source of power not shown. Means 57, of usual form, may be provided to adjust the stroke of the connecting rods 56.

Immediately following the severance of parts from the stock wires $w^1$—$w^7$ inclusive, the parts so severed are formed into staples or blanks, preferably of the character shown in Fig. 13, and this step may be performed by any suitable means, for which purpose in the instance illustrated the plungers 52 are shown as having their lower portions grooved as indicated at 62 (see Fig. 9) and the plungers are further provided with grooved die portions 63 of inverted U-shape, these die portions acting upon the blanks $w^1$—$w^7$ respectively to bend them downward over anvils 64. These anvils preferably are mounted upon slide members 65, which are caused to reciprocate horizontally by the engagement of anti-friction rolls 66 extending therefrom into the path of yokes 67 (see Fig. 8 and Fig. 3) carried by levers 68 which are pivoted respectively at 69 upon posts 70 extending rearwardly from a bracket 71 projecting from the over-head frame structure E (see Figs. 1–3).

The levers 68 have arms 72 with anti-friction rollers 73 entering cam grooves 74 in cam blocks 75 carried by a gate $E^{10}$ which slides in vertical ways $E^{11}$, and when this gate descends, a cam portion $76^x$ of each cam block 75 is brought at the beginning of the downward stroke of the gate into engagement with the roll 73 causing each slide 65 to move outwardly from the front of the forming head, into the position shown in full lines in Fig. 8. It is in this position that the anvils receive and aid in forming the blanks $w^1$–$w^7$ inclusive under the action of the plungers 52 as the latter are forced downward by the heads $E^1$ and $E^2$ when the head $E^3$ descends.

In order to aid in holding the stock wire parts after severance and during this downward forming movement of the plungers 52, provision is preferably made for engagement with the middle of each severed wire part by an arm 77 of a lever 78 mounted pivotally on the block 80 carried by the bracket $E^{20}$ of the gate $E^{10}$, on which the anvil slide 65 reciprocates horizontally as above described, relatively to the lever 78. In order that the movements of the lever 78 may be controlled positively, I have shown the slide 65 as having cam portions 81 and 82 adapted to be engaged with the heel 83 of an arm 84 which extends outwardly from the pivot point 79 of the lever 78. In the full line position shown in Fig. 8, heel 83 rests upon the upper face 85 of the slide 65, and in this position the arm 77 of the lever 78 is held against the U-shaped intermediate portion of the staple $w^1$, and this position is maintained until the die portion 63 of the plunger 52 has reached its lowest position after bending the wire part into the form of a staple, as in Fig. 8.

The slide 65 is then moved inwardly by the action of yoke 67 upon the roller 66 as the lever 68 is rocked about its fulcrum 69 when the cam block 75 is elevated by the gate $E^{10}$ (described later) and the cam surface 76 is engaged with the roller 73 upon the arm 74 of lever 68, at the end of the upward stroke.

The staples just formed are carried inward with the anvils 64, suitable projections 86 and 87 being preferably provided to prevent each staple from tilting on its anvil, and as each staple is thus carried forward it passes under a finger 88 (see Fig. 8) formed at the end of the arm 77 of lever 78, the lever 78 rocking upon its pivot 79, and this rocking movement being permitted by entry of the heel 83 into the cutout portion 89 between the cam surfaces 81 and 82 upon the upper surface of the slide 65.

The inward movement of the slides 65 continues until the anvils 64 with the staples are brought into the dotted line position (shown in Fig. 8 for example) and as the loop portion of the staple escapes from under the finger 88, the heel 83 of lever arm 84 rides up on cam 82, which causes the finger 88 to assume again the position shown in Fig. 8, the finger being depressed behind the loop portion of the staple. Then the slide 65 is again withdrawn outwardly by action of the yoke 67 and roll 66 when the cam block 75 descends with the gate $E^{10}$, and the cam surface $76^x$ of the block 75 engages with roller 73 upon arm 72 of lever 68, swinging the lever 68 outward to retract the slide 65, the slide carrying with it the anvil 64, but leaving the staple $w^1$ in the path of a part 90 of the plunger structure by which it is to be forced into the die F as will be described more in detail hereinafter. At the end of the rearward movement of slide 65 the heel 83 of lever arm 84 rides up the cam surface 81 into the position shown in Fig. 8 and is thereby brought into firm engagement with a fresh, unbent part of wire $w^1$ which has been fed across the anvil 64 and is ready to be severed by downward movement of the shear portion 51 of the plunger 52, across the edge 50 of the stationary shear $d^1$ (see Fig. 9), this operation being repeated for each staple, and a similar operation taking place concurrently upon each of the stock wires $w^1$ to $w^7$ inclusive at each stroke of the head $E^3$. As it is desirable to provide the levers 78 with a normal bias into the full line position shown in Fig. 8, I prefer to provide means for that purpose, such as the springs 91 (see Fig. 4) interposed between the lever arms 84 and the blocks 80. The strength of these springs is such that they permit the fingers 88 to ride over the U-portion of the staples as the latter are carried forward with the anvils 64 by forward movement of the slides 65.

The shape of the levers 78 is preferably arched, as shown in Fig. 8 to afford clearance for the stock wires and for the guides of which the parts 50 serve as stationary shear members for certain of the stock wires, as for example the guide $d^4$ for the stock wire $w^4$ in Fig. 8.

*Link forming operation and mechanism*

The operation of forming the staples into links includes a series of steps among which may be included the preparatory step of inserting the staple in a holding block 100 (see Figs. 7 and 8) which is positioned at the inner end of the horizontal path through which the anvil is moved by inward movement of the slide 65 above described, this preliminary position being likewise in the vertical path which has to be traversed by the plunger part 90 as it is carried down by the head $E^2$ under action of the head $E^3$. Fig. 7 illustrates two of these heads 100 with the staples $w^1$ and $w^4$ in place, each member 100 having grooved portions 101 and 102 which grip the legs of the staple, the latter being forced into the grooves by the inward movement of the slide 65 and anvil on which the staple is supported. This figure shows not only the formed staple in place ready for the action of plunger 90, but shows also the next wire parts $w^1$ and $w^4$ in position ready for severance by action of the appropriate plungers 52 (not shown), against the stationary shear edges 50, which in the case of the shears for wire $w^1$ is constituted by the separate guide member $d^1$, as already noted.

In order to prevent any undesirable tilting or rocking movements of the staple, I prefer to provide each anvil with an extension 103, such as that shown at the left hand portion of Fig. 7, which passes within the staple and into a slot 104 in the holding block 100, so that when the anvil 64 is being withdrawn this projection 103 continues to hold the staple against accidental displacement until it shall have been engaged by the lower end of the plunger 90.

The holding blocks 100 are preferably all mounted upon the gate $E^{10}$, to which reference has already been made as carrying the cam block 75.

The gate $E^{10}$ is operated by levers 92 (see Figs. 1 and 3) which are adapted to rock upon a shaft 93, and which are actuated by cams 94 on shaft 30, being provided with anti-friction rollers 95, the cams 94 serving to elevate the gate $E^{10}$ positively and thus actuate the cam-blocks 75 positively in the manner already described, while the descent of the gate $E^{10}$ by its own weight is permitted when the low parts 96 of the cams 94 are in the position shown in Fig. 3.

The next step in the forming operation is brought about by the descent of the plunger 90 when the head $E^3$ is depressed, carrying with it the heads $E^1$ and $E^2$ upon which are mounted the seven plungers 90, which are thereby operated in unison.

When so depressed, each plunger forces a staple downwards through a pair of guides 110 and 111, of which a typical set is shown in Fig. 10, these guides being placed beneath the holding blocks 100, in the vertical path of the plunger 90.

The guide block 110 is preferably adapted to operate upon the staple for the purpose of imparting to one leg of the staple its first bending, in order to bring it from the shape shown at $w^{10}$ in Fig. 22 to the shape shown at $w^{11}$ in Fig. 22, the staple being illustrated as having its leg $w^{12}$ bent forward toward the observer, ou tof the plane of the drawing.
In order to bring about this first bend, the guide block 110 has an inclined guide or die groove 112, which is shown in elevation in Fig. 11, the leg $w^{12}$ of the staple being indicated by dash and dot lines, and the block 110 is preferably provided with a rib 113 adjacent to the groove 112, and aiding to direct the leg $w^{12}$ into the groove 112.

The other leg $w^{14}$ of the staple is held in the slightly grooved portion 114 of the block 110, (see Fig. 10) the opposite block 111 being of suitable contour at that region to aid in holding the leg $w^{14}$ in that position, the block 111 being also recessed at 115 to receive the plunger 90, the cross section of the latter being preferably approximately that illustrated, the plunger having a groove 116 to clear the rib 113 formed on the block 110 and already described.

It is to be noted that the staples are formed in parallel planes which are inclined at an angle to the path of feeding of the dies F so that as the staples are forced downwardly, they enter the die blocks F in suitable relative positions to permit the links to be formed in interlinking relation, and the stock wires $w^1$ to $w^7$ are fed at proper angles for this purpose as already described.

The next step in formation of the staples consists in imparting to the legs $w^{12}$ the inward bend illustrated at $w^{15}$ in Fig. 22, this bend being performed by a portion 117 of the block 110, see Figs. 3 and 11. The purpose of this bend $w^{15}$ is to give one of the legs a slight offset in advance of the further bending operations which are performed simultaneously upon both legs of the staple by the action of the die F.

The staple $w^1$, for example, has been brought in the course of the steps thus far described, to a point where the end $w^{15}$ and the end $w^{16}$ are respectively engaged with the die F, the leg $w^{15}$ being engaged with the cavity $f^1$ of the die (see Fig. 14), and the leg $w^{16}$ being engaged with the cavity $f^{1x}$ of the die. If this operation be considered as performed by hand, for the sake of illustration, the operator would be pressing the staple $w^{17}$, which is in the condition shown in the fourth position from the right hand in Fig. 22, toward the surface of the die shown in Fig. 14 of the drawings, and the leg $w^{15}$ would thereupon be curled first toward the operator, as its end travelled along the groove from the point $f^1$, past the region $ff$ shown in Fig. 26 and then away from the operator to the region $ff^x$ shown in Fig. 26, making thus the right hand loop of the link shown at $w^{21}$ in Fig. 22, this loop being inclined downward toward the operator.

At the same time, the leg $w^{16}$ would be first engaged with the region $f^1x$ and be curled as it travels therefrom toward the left, away from the operator, around past the region $ff^1$ shown in Fig. 26 and then toward the operator as it passes to the region $fx^2$ shown in Fig. 26, making the left hand loop of the link shown at $w^{21}$ in Fig. 22, this loop being inclined downward away from the operator, and the curling action having resulted in bringing the ends $w^{22}$ and $w^{23}$ back toward each other as shown in Fig. 22.

At the same time, the staple $w^4$ is forced down by the proper plunger, to cause engagement of its legs with the cavities $f^4$ and $f^{4x}$ of the die, and simultaneously the staple $w^7$ is forced down by the proper plunger to cause engagement with the cavities $f^7$ and $f^{7x}$ of the die, the simultaneous stroke of these three plungers, carried by the crosshead $E^1$ resulting in the complete formation of the three links $w^1$, $w^4$ and $w^7$ shown in Figs. 12 and 13, occupying the spaced positions illustrated.

As the plungers 90 descend the ends $w^{15}$ and $w^{16}$ of the respective staples are gradually bent relatively to each other through a series of stages of bending of which typical stages are shown at $w^{17}$, $w^{18}$, $w^{19}$ and $w^{20}$, in Fig. 22, until each completed link has a form substantially that shown in $w^{21}$, it being understood that the operation is continuous and that at any given instant each link is changing from shapes not dissimilar to one of the stages selected for illustration to a shape resembling that of the next stage selected. These leg-bending movements are accomplished by a direct thrust exerted along the major axis of each staple, and obviate any need for twisting movements of any of the tools operating to produce the twisted links.

The form of die F shown in Fig. 14 represents a now-preferred arrangement of the die surface adapted to effect suitably and accurately the formation of a link of desired shape, such as that shown at $w^{21}$, but it is to be understood that the exact shape of die selected for use will be given a contour proper to the formation of the desired shape of link.

It is further to be observed that the die F and the blocks 110 and 111 co-operate in the operation of forming the staples into links which are so positioned that certain of the links are formed separately while other links are formed in interlinking relation with already formed links, as has been set forth sufficiently at an earlier stage of this specification, so that it need not be repeated in detail.

It may be noted, however, that in forming the links it is preferred to position the staples in each operation substantially as indicated diagrammatically at the lower part of Fig. 13, i. e., the staples $w^1$, $w^4$ and $w^7$ being inserted with their legs at an angle to the longitudinal axis of the chain, and straddling the same as indicated at the right-hand side of Fig. 13, and the links $w^2$ and $w^5$ being inserted at a similar angle, while the links $w^3$ and $w^6$ may advantageously be inserted in a plane corresponding to the longitudinal axis of the chain and not straddling the same, substantially as shown at the left-hand side of Fig. 13. As already noted, Fig. 12 illustrates three stages of formation of a complete chain of seven links, the first stage designated by the reference character $F^1$ showing the links $w^1$, $w^4$ and $w^7$, while the stage $F^2$ shows the aforesaid links with the additional links $w^2$ and $w^5$ formed in interlinking relation respectively with the already formed links $w^1$ and $w^4$, and the stage $F^3$ showing the complete chain constituted by forming links $w^3$ and $w^6$ in such manner that the link $w^3$ connects links $w^2$ and $w^4$ while the link $w^6$ connects links $w^5$ and $w^7$.

Any suitable mechanism may be provided to effect the feeding movement of the dies F to bring each die successively into its three positions $F^1$, $F^2$ and $F^3$, and as one convenient form of mechanism for the above purpose I have shown a shaft 120 (see Figs. 3 and 5) geared at 121 to the shaft 30 and having a crank 122 provided with an antifriction roller 123 adapted to engage the end walls 126 of the die blocks $F^x$, imparting the necessary step-by-step movement to the die-block conveyor. The shaft 120 is also provided with a member 124 adapted to enter the die-block recesses 125 and maintain the die-blocks in proper position during the dwells between feeding movements, while the forming operations are taking place.

The above described forming operation, or cycle of operations, results in the completion of a chain of seven links, or of the desired number of links, with each three strokes of the forming head $E^3$, and after the first three strokes of the press a complete chain is ready for delivery on each stroke of the press, the chains being available for use with or without further operations, according to the use for which the chains are intended.

In the instance selected for illustration and description it is desirable to perform upon certain links of each chain a welding operation designed to secure the free ends $w^{22}$ of each link (see Fig. 22) to the strand or middle portion 23 of the link, and to each other, in order to form an integral central node or integral metallic union of the aforesaid parts at this region, and for this purpose any suitable mechanism may be provided, and one such mechanism will now be described.

*Welding operation and mechanism*

As a convenient form of mechanism for this purpose I have shown the welding units $G^2$, $G^3$, $G^4$, $G^5$ and $G^6$ each adapted to weld one link at a time, the chains being carried past the welding units successively, so that after the entire series of units has been traversed, each of five links of each chain will have been welded, it being understood, as already noted, that in cross chains of the type selected for description it is usually desirable to weld only those links subjected to road contact, leaving the end links without a welding operation, but it being further understood that any selected link or links of the chains may be welded by providing a suitable number of welding units.

The welding units $G^2$—$G^6$ are shown as mounted in sliding position upon a base $G^8$, (see Figs. 1, 2, 18 and 20) the base having a rack or racks 150 engaged by pinions 151 (see Fig. 20) upon shafts 152 mounted in bearings on carriages 153 upon which the respective welding units are mounted, as indicated, so that each welding unit may be readily adjusted to desired position by operation of its shaft 152. Each welding unit may desirably comprise a transformer T of any suitable construction, each supported by a standard $t$ bolted at $t^1$ upon one of the carriages 153. This standard, in each instance, also supports a fixed welding tool $t^2$ mounted adjustably in a clamping device $t^3$. A co-operating welding tool $t^4$ is supported in a clamp $t^5$ mounted upon a swinging jaw $t^6$ supported pivotally at $t^7$ upon each standard $t$, and each of these swinging jaws $t^6$ is actuated through a link $t^8$ by a lever $t^9$ mounted at $t^{10}$ upon the carriage 153, the lever having an arm with an anti-friction roller $t^{11}$ running in a face cam groove $t^{12}$ of a cam disk $t^{13}$, these cam disks being fixed upon a shaft $t^{14}$ extending along the rear of the welding mechanism, the cam disks being preferably provided with gears $t^{15}$ meshing with gears $t^{16}$ fast upon a shaft $t^{17}$ which is geared at $t^{18}$, $t^{19}$ to the countershaft 30 hereinbefore referred to and which is actuated by suitable connections 41 with the crank shaft $E^7$ so that the welding operations are performed in timed relation with the forming and feeding operations.

Transfer mechanism

For the purpose of transferring the completed chains successively to the series of welding units, any suitable transfer mechanism may be adopted, and I have illustrated a now-preferred form of transfer mechanism which I have devised for this purpose, the same being illustrated in its assembled relation with the machine as a whole in Figs. 1 and 2 and being illustrated in sufficient detail in Figs. 18 to 21 inclusive to enable its mode of operation to be understood. It is to be noted that while this mechanism is particularly adapted for use in connection with the organized machine forming the subject of the present application, it embodies means capable of utilization in welding chains and similar articles aside from its combination with the other mechanisms comprised in the chain machine herein described.

In its general relationship to the organized machine, the transfer mechanism, as already noted, comprises an endless link belt or conveyer designated generally by the reference character G and which has a portion at the region $G^1$ arranged in juxtaposition with the path of travel of the die blocks $F^x$ (see Figs. 2, 18 and 19).

As each die block $F^x$ emerges from the forming head E, with its die F, carrying a completed chain comprising links $w^1$ to $w^7$, the chain is preferably subject to the action of a roller 160 (see Fig. 19) journalled in a bracket 161 carried by the frame part 162, the action of the roller 160 being to insure the presentation of all the links of each chain at a uniform level as the same are transferred for action by the welding units.

The roller 160 preferably is arranged to act upon the chain at the point where the chain is picked up by the conveyer G, and a now-preferred form of device for holding each chain upon the conveyor G will now be described.

The conveyer G preferably comprises a series of links 163 each having a pair of gripping devices respectively designated by the numerals 164 and 165, secured to the respective links by suitable means such as the bolts 166 (see Fig. 18). The links 163 may have holes 167 suitable in number and position to permit one of the gripping devices to be mounted adjustably upon its link, so that different lengths of chains may be fed. As the gripping devices are of generally similar construction, they will be described with similar reference characters, so far as possible. The gripping device 164 of each pair has a hook shaped member 168 and the gripping device 165 has a similar hook shaped gripping member 169.

Referring to Fig. 18, it will be observed that the complete chain carried by each block $F^x$ lies upon the die F with the portions 23 uppermost as is also shown clearly in Fig. 21, the ends 21 and 22 being underneath in the position in which they have been formed in the die, so that preferably the transfer mechanism is arranged to draw the chains from the dies successively while maintaining the links in this relative position.

For the above purpose the gripping devices 164 and 165 upon each link are arranged upon the inner faces of the links, as shown in Fig. 2, so that the gripping devices are presented upwardly above the link bars 163 for ready observation as the chains are transferred through the welding units.

Accordingly, as the chain G runs on its supporting sprockets 170, each hook-shaped gripping member 169 is carried into contact with the leading end of the chain, and the movement of the chain G is timed to cause the hook member 169 to overlie the end loop 171 of the leading link $w^7$ of its chain, as shown clearly in Fig. 21. Preferably the under surface of the hook shaped finger 169 is recessed, as indicated in dotted lines at 178, suitably to conform in contour with the loop 171, extending along the shank portion 23 in such a manner as to afford a firm abutment therefor. The hook shaped finger 168 of each clamping device 164 has a recess 179 of similar contour, but shaped properly to receive an end loop 180 of the link $w^1$ of the chain. The hook shaped members 168 and 169 are preferably formed as fixed parts of their respective clamping devices 164 and 165.

For the purpose of enabling the clamping devices to grip these end links firmly during the transfer and welding operations, each of the clamping devices 164 is shown as provided with a movable member 181 having a finger 182 of suitable contour at its end for engagement with the strand 23, and also to overlie the loop portion 180, when the finger 182 occupies its advanced full line position as shown in Fig. 21. So also each clamping device 165 has a movable member 183 provided with a finger 184 arranged at its forward end to engage the strand portion 23 of the end link $w^1$ at the region opposite that engaged by the hook member 169, so that the strand portions 23 are gripped between the hook shaped members and the movable fingers in each of the clamping devices. For the purpose of effecting this gripping action positively, each of the clamping devices is shown as provided with an anti-friction roller 185 at its end near the front of the machine, and the portion 186 of the machine which constitutes the slideway for the transfer mechanism is provided with a ledge 187 bolted thereto and having a cam surface at 188 adapted to be engaged by the rollers 185 successively and when so engaged to force the members 181 and 183 toward the chains, until the fingers 182 and 184 enter firmly into engagement therewith. Opposite the cam ledge 187 is a similar cam ledge 189 having at 190 a cam surface which serves to retract the rollers 185 to open the clamping fingers prior to their engagement with the chains, as indicated at the right-hand side of Fig. 18.

The cam face 188 is preferably timed to act upon each movable member 183 and 181 just prior to passage of the latter under the roll 160, and thus the leading end of the chain is gripped and drawn under the roller before the trailing end is gripped by the movable finger 182, thus causing the chain to be straightened out properly under the roll 160. As the chains are carried forward by the dies F, after having been thus gripped, they are stripped from the dies when the die blocks $F^x$ are turned out of supporting position as the die block conveyer passes around the sprocket 191 at the left-hand end of its run (see Fig. 2) and thereafter they retain the chains supported entirely by the clamping devices as shown in Figs. 18 and 21, until the welding operations have been completed.

In Fig. 18 the last of the welding units is shown at $G^6$, and the preferred arrangement for releasing the chains is shown at the left hand end of Fig. 18.

The cam ledge at 187 is shown as terminating at this region and the cam ledge 189 is shown as having a cam surface 193 in position to engage the rollers 185 respectively and operate upon them to retract the fingers 184 and 182 successively, so that the leading end of the chain is first released, allowing the chain to drop into the position shown at $w$, near the left-hand side of Fig. 18, and then the finger 182 is retracted, releasing the trailing end of the chain, which is allowed to drop out of the machine, having been welded at all the desired points.

From the above description, it will be understood that each time the dies are stopped in position for a forming stroke of the cross head $E^3$, the five movable welding tools $t^5$ shown in Fig. 20 are moved into the welding position there shown by action of the cams $t^{13}$ upon the rollers $t^{11}$, rocking the levers $t^9$ about their pivots $t^{10}$ and causing links $t^8$ to move tools $t^4$ upward so that each welding tool $t^4$ forces its particular link of the chain up against the welding tool $t^2$ and effects the welding operation, the welding current being turned on by suitable mechanism not shown. Thus all five welding operations are performed simultaneously one upon each of the links to be welded, the welding tools being suitably spaced relatively to each other for contact with the desired link in the series in each chain.

*Controlling mechanism*

Any suitable means may be provided to permit manual control of the machine, and I prefer to provide also suitable means for stopping the machine automatically when extraneous objects get into positions where they would injure the parts if the machine were permitted to continue its operation, and also when one of more of the links occupies an unduly elevated position on a die.

As a suitable form of starting and stopping mechanism, I have shown in Fig. 25 a well-known form of clutch $E^{12}$ associated with the shaft $E^7$ and including latches $s^1$, $s^2$ adapted to be operated by a rod $s$ connected with a shipping lever S, which can be actuated manually or automatically. In the position shown in Fig. 25, the shipper lever S is set for operation of the machine, the latches $s^1$ and $s^2$ being retracted to permit rotation of shaft $E^7$. A spring $s^6$ tends normally to raise the shipper lever S and to throw the latches $s^1$ and $s^2$ into position to throw out the clutch $E^{12}$ and stop rotation of shaft $E^7$.

To hold the shipper lever S in the position shown in Fig. 25, it is engaged by a latch $s^2$ on a lever $s^3$ on a bracket $s^5$ projecting from the forming head E, and a coil spring $s^8$ tends to draw the lever $s^3$ toward a post $s^9$ on the head, the movement of the lever in that direction being limited by a post $s^{15}$ depending from bracket $s^5$.

The shipping lever can be thrown off manually by moving the same toward the left from the position shown in Fig. 23, against the action of spring $s^8$, and then releasing it for upward movement under the action of spring $s^6$, when latches $s^1$ and $s^2$ will stop clutch $E^{12}$, stopping the machine.

The same stopping operation can be effected automatically if any link projects upward too far from any die, by the following mechanism, viz. by a link $s^7$ exending from the lower end of lever $s^2$ along the front of the forming head as shown in Figs. 23 to 25 (see also Fig. 4) and connected with a series of swinging levers $s^{10}$ each of which is fixed upon a short rock-shaft $s^{11}$ mounted at $s^{12}$ in the ledge $E^{20}$ of the gate $E^{10}$, the inner ends of these levers each having a trip $s^{13}$ which is cut away at $s^{14}$ upon its lower end sufficiently to permit normal clearance of the upwardly projecting middle strand portions 23 of the chain links as they lie in the dies F after having been formed and while the dies are being fed from position $F^1$ to $F^2$ and $F^3$.

If, however, any such portion 23 extends up a small distance above its normal height, it will engage one of the trips $s^{13}$ and will rock the shaft $s^{11}$ and a lever $s^{10}$ and move link $s^7$ toward the left, pulling lever $s^3$ and latch $s^2$ away from shipping lever S which is thus released and drawn upward by spring $s^6$ causing rod $s$ to move latches $s^1$ and $s^2$ into position to throw off clutch $E^{12}$ and stop the machine.

In pursuance of another object of the invention, the machine will be stopped automatically by throwing off the lever $s^3$ and latch $s^2$, to release the shipping lever S as above described, by means of a bell-crank lever $s^{16}$ mounted on a bracket $s^{22}$ extending from a suitable position of the head E, this bell-crank lever being actuated through a system of links $s^{17}$ and levers $s^{18}$ by a lever $s^{19}$ having a part $s^{20}$ adapted to be moved into the path of a projection 106 (see Fig. 24) on an arm 105 fixed upon the shaft 30 which carries the cams 94 that operate gate $E^{10}$ on which the link-forming blocks 100 and 110 are mounted.

As already described, the cams 94 operate the gate levers 97 through the medium of anti-friction rollers 95 (see Figs. 3, 3a and 3b) and when the low part 96 of the cam 94 is traversing the position of the roller 95 shown in Fig. 3, the gate is permitted to descend by its own weight to lower the forming blocks 110 down upon the dies F.

Normally this descent occurs regularly, every time the cam part 96 comes around, but if any object gets in between one of the dies F and a block 110, as for example if a piece of wire stock of unsuitable size is cut off, or a link is malformed, or if a tool or some other extraneous object intervenes in the path of the gate or any of its associated parts, then the gate $E^{10}$ will be supported against gravity and will not descend to the bottom of its path, and its arm 97 carrying the roll 95 will be held in approximately the position shown in Figs 3a and 3b.

The lever $s^{19}$ (already described as connected by levers $s^{17}$ and links $s^{18}$ to the throw-off lever $s^{16}$) is mounted at $s^{21}$ upon a bracket 98 of the arm 97 of one of the gate-levers 92, and presents its finger $s^{20}$ at all times closely adjacent to the path of the projection 106 on the arm 105 fixed on the shaft 30 which operates cams 94 to swing the gate-levers 92, but normally there is sufficient clearance between the projection 106 and the finger $s^{20}$ to permit the projection 106 to swing around in its path without engaging the finger $s^{20}$.

When, however, the arm 97 of lever 92 is in the position shown in Fig. 3a, the finger $s^{20}$ will be engaged by the projection 106, and as the arm 105 swings around, its projection 106 turns the lever $s^{19}$ around its pivot $s^{21}$ and moves the system of links $s^{17}$ and levers $s^{18}$ to cause the throw-off lever $s^{16}$ (see Fig. 24) to push the arm $s^3$ toward the left, carrying the latch $s^2$ from above the shipping lever S which is thus released and is free to be drawn upward by spring $s^6$, causing the rod $s$ to throw in the latches $s^1$ and $s^2$ stopping the machine.

The above mechanism constitutes an extremely sensitive detector means, and is timed to stop the descent of the head $E^3$ and its plungers before any damage can be done to any of the parts.

Preferably means will be also provided to shut off the welding current simultaneously with stoppage of the press, and for this purpose I have shown a switch $S^1$, in circuit with the welding units, and connected at $s^{23}$ with one of the links $s^{17}$ (see Fig. 24) so that upon throw-off movement of the latter, the switch will be opened, and can only be closed by manual operation of the handle $s^{24}$.

The organized machine above described is thus protected against accidental damage, and against carelessness on the part of the operator, and is automatic in its performance of the several operations described, being also under complete control from a central frontal standpoint, readily accessible to the operator. The forming mechanism and welding mechanism are respectively capable of embodiment in other types of machine, or of use, independently of each other, for their several purposes.

I claim:

1. In the process of making a twisted chain link of the type characterized by a length of wire having its ends bent toward its central portion forming loops at each side of said central portion, the steps which include bending said length of wire into the form of a staple, then forcing said staple into a die having adjacent cavities arranged in angular positions adapted to bend the legs of said staple around to form said loops into a twisted link, said leg-bending operations being accomplished by a direct thrust of said staple along its major axis.

2. In the process of making a twisted chain link of the type characterized by a length of wire having its ends bent toward its central portion forming loops at each side of said central portion, the steps which include bending said length of wire into the form of a staple, then forcing said staple into a die having adjacent cavities, arranged in angular positions adapted to bend the legs of said staple around to form said loops into a twisted link by a single, continuous operation comprising a direct thrust of said staple along its major axis.

3. In the process of making a twisted chain link of the type characterized by a length of wire having its ends bent toward its central portion forming loops at each side of said central portion, the steps which include bending said length of wire into the form of a staple, then forcing said staple into a die having adjacent cavities arranged in angular positions adapted to bend the legs of said staple around to form said loops into a twisted link, said loops lying in different radial positions relative to the longitudinal axis of the link, said leg-bending operations being accomplished by a direct thrust of said staple along its major axis.

4. In the process of making a chain link of the type characterized by a length of wire having its ends bent toward its central portion forming loops at each side of said central portion, the steps which include bending said length of wire into the form of a staple, then forcing said staple into a die having adjacent cavities adapted to bend the legs of said staple around to form said loops and to dispose the ends of said legs in crossed relation.

5. In the process of making a chain link of the type characterized by a length of wire having its ends bent toward its central portion forming loops at each side of said central portion, the steps which include bending said length of wire into the form of a staple, then forcing said staple into a die having adjacent cavities adapted to bend the legs of said staple around to form said loops and to dispose the ends of said legs in crossed relation each extending into the loop formed by the other end.

6. In the process of making a chain link of the type characterized by a length of wire having its ends bent toward its central portion forming loops at each side of said central portion, the steps which include bending said length of wire into the form of a staple, then forcing said staple into a die having adjacent cavities adapted to bend the legs of said staple around to form said loops and to dispose the ends of said legs in crossed relation each extending into the loop formed by the other end, and then uniting said ends integrally with the central portion of said wire.

7. In the process of making a chain link of the type characterized by a length of wire having its ends bent toward its central portion forming loops at each side of said central portion, the steps which include bending said length of wire into the form of a staple, then forcing said staple into a die having adjacent cavities adapted to bend the legs of said staple around to form said loops and to dispose the ends of said legs in crossed relation each extending into the loop formed by the other end, and then uniting said ends integrally with the central portion of said wire and with each other.

8. In the process of making a chain link of the type characterized by a length of wire having its ends bent toward its central portion forming loops at each side of said central portion, the steps which include bending said length of wire into the form of a staple, then forcing said staple into a die having adjacent cavities adapted to bend the legs of said staple around to form said loops and to dispose the ends of said legs in crossed relation each extending into the loop formed by the other end and then welding said ends to the central portion of said wire and to each other to form a central integral node or union.

9. In the process of making a chain of the type including twisted links each characterized by a length of wire having its ends bent toward its central portion forming loops at each side of said central portion, the steps which include bending each of said lengths of wire into the form of a staple, then forcing said staples into a die having adjacent cavities arranged in angular positions adapted to bend the legs of each staple around to form said loops into a twisted link, said leg-bending operations being accomplished by a direct thrust of said staple along its major axis.

10. In the process of making a chain of the type including twisted links each characterized by a length of wire having its ends bent toward its central portion forming loops at each side of said central portion, the steps which include bending each of said lengths of wire into the form of a staple, then forcing said staples successively into a die having adjacent cavities arranged in angular positions adapted to bend the legs of each staple around to form said loops into a twisted link, said leg-bending operations being accomplished by a direct thrust of said staple along its major axis.

11. In the process of making a chain of the type including twisted links each characterized by a length of wire having its ends bent toward its central portion forming loops at each side of said central portion, the steps which include bending each of said lengths of wire into the form of a staple, then forcing said staples into a die having adjacent cavities adapted to bend the legs of each staple around to form twisted loops, and with an end loop of one link interlinked with an end loop of an adjacent link, said leg-bending operations being accomplished by a direct thrust of said staple along its major axis.

12. In the process of making a chain of the type including links each characterized by a length of wire having its ends bent toward its central portion forming loops at each side of said central portion, the steps which include bending each of said lengths of wire into the form of a staple, then forcing said staples into a die having adjacent cavities adapted to bend the legs of each staple around to form said loops, and with each end loop of one link interlinked with an end loop of the link respectively adjacent each end loop, said leg-bending operations being accomplished by a direct thrust of said staple along its major axis.

13. In the process of making a chain, the steps which comprise severing from each of a plurality of stock wires a part suitable in length to serve as a blank for one link in said chain, bending said severed parts to impart thereto a predetermined preliminary form, then forcing several of said preformed parts simultaneously into spaced cavities of a die to form said preformed parts into links, then feeding said die and links, while maintaining their spaced relation, into position to receive a secondary set of preformed parts formed in a preceding step, and forcing said secondary set of preformed parts into other cavities of said die suitably spaced to cause each of said secondary set of parts to interlink, while being formed, with a link of said first mentioned set of links, then feeding said die with said groups of interlinking links in their relative positions of original formation until said die presents said groups of links in a further position suitable to receive a further set of preformed parts so placed as to complete the connection of the groups of links, thus completing the chain.

14. In the process of making a chain, the steps which comprise severing from each of a plurality of stock wires a part suitable in length to serve as a blank for one link in said chain, bending said severed parts simultaneously to impart thereto a predetermined preliminary form, then forcing several of said preformed parts simultaneously into spaced cavities of a die to form said preformed parts into links, then feeding said die and links, while maintaining their spaced relation, into position to receive a secondary set of preformed parts formed in a preceding step, and forcing said secondary set of preformed parts simultaneously into other cavities of said die suitably spaced to cause each of said secondary set of parts to interlink, while being formed, with a link of said first mentioned set of links, then feeding said die with said groups of interlinking links in their relative positions of original formation until said die presents said groups of links in a further position suitable to receive a further set of preformed parts so placed as to complete the connection of the groups of links, thus completing the chain.

15. In the process of making a chain, the steps which comprise severing from each of a plurality of stock wires a part suitable in length to serve as a blank for one link in said chain, bending said severed parts to impart thereto a predetermined preliminary form, then forcing several of said preformed parts into spaced cavities of a die to form said preformed parts into links, then feeding said die and links, while maintaining their spaced relation, into position to receive a secondary set of preformed parts formed in a preceding step, and forcing said secondary set of preformed parts into other cavities of said die suitably spaced to cause each of said secondary set of parts to interlink, while being formed, with a link of said first mentioned set of links, then feeding said die with said groups of interlinking links in their relative positions of original formation until said die presents said groups of links in a further position suitable to receive a further set of preformed parts so placed as to complete the connection of the groups of links, thus completing the chain, then welding and discharging said completed welded chain.

16. In the process of making a chain, the steps which comprise severing from each of a plurality of stock wires a part suitable in length to serve as a blank for one link in said chain, bending said severed parts to impart thereto a predetermined preliminary form, then forcing several of said preformed parts into spaced cavities of a die to form said preformed parts into links, then feeding said die and links, while maintaining their spaced relation, into position to receive a secondary set of preformed parts formed in a preceding step, and forcing said secondary set of preformed parts into other cavities of said die suitably spaced to cause each of said secondary set of parts to interlink, while being formed, with a link of said first mentioned set of links, then feeding said die with said groups of interlinking links in their relative positions of original formation until said die presents said groups of links in a further position suitable to receive a further set of preformed parts so placed as to complete the connection of the groups of links, thus completing the chain, then feeding said completed chain to welding mechanism, and then welding and discharging said completed and welded chain.

17. In the process of making a chain, the steps which comprise severing from each of a plurality of stock wires a part suitable in length to serve as a blank for one link in said chain, bending said severed parts to impart thereto a predetermined preliminary form, then forcing several of said preformed parts into spaced cavities of a die to form said preformed parts into links, then feeding said die and links, while maintaining their spaced relation, into position to receive a secondary set of preformed parts formed in a preceding step, and forcing said secondary set of preformed parts into other cavities of said die suitably spaced to cause each of said secondary set of parts to interlink, while being formed, with a link of said first mentioned set of links, then feeding said die with said groups of interlinking links in their relative positions of original formation until said die presents said groups of links in a further position suitable to receive a further set of preformed parts so placed as to complete the connection of the groups of links, thus completing the chain, then removing said completed chain from said die and feeding said completed chain to welding mechanism, and then welding and discharging said completed and welded chain.

18. In the process of making a chain, the steps which comprise severing from stock wire a plurality of parts each adapted to serve as a blank for one link in said chain, bending said severed parts to impart thereto a predetermined preliminary form, then forcing several of said preformed parts into spaced cavities of a die to form said preformed parts into links, then feeding said die and links, while maintaining their spaced relation, into position to receive a secondary set of preformed parts formed in a preceding step, and forcing said secondary set of preformed parts into other cavities of said die suitably spaced to cause each of said secondary set of parts to interlink, while being formed, with a link of said first mentioned set of links, then feeding said die with said groups of interlinking links in their relative positions of original formation until said die presents said groups of links in a further position suitable to receive a further set of preformed parts so placed as to complete the connection of the groups of links, thus completing the chain; then feeding said completed chain successively into position for transfer to a series of welding units, and transferring and feeding said chain to said welding units in succession, each welding unit acting to weld a component link occupying a predetermined serial position in said chain, all of the links of said chain having been welded when said chain has traversed all the welding units, then discharging said completed and welded chain.

19. In the process of making concurrently a plurality of chains, the steps which comprise severing from each of a plurality of stock wires a part suitable in length to serve as a blank for one link in one of said chains, bending said severed parts simultaneously to impart thereto a predetermined preliminary form, then forcing into spaced cavities of each of a plurality of dies several of said preformed parts to form said preformed parts into links, then feeding said dies and links, while maintaining their spaced relation, into position to receive secondary sets of preformed parts formed in a preceding step, and forcing said secondary sets of preformed parts into other cavities of said dies suitably spaced to cause each of said secondary sets of parts to interlink, while being formed, with a link of said first mentioned set of links, then feeding said dies with said groups of interlinking links in their relative positions of original formation until said dies present said groups of links in further positions suitable to receive further sets of preformed parts so placed as to complete the connection of the groups of links, thus completing the chains.

20. In the process of making concurrently a plurality of chains, the steps which comprise severing from each of a plurality of stock wires a part suitable in length to serve as a blank for one link in one of said chains, bending said severed parts simultaneously to impart thereto a predetermined preliminary form, then forcing into spaced cavities of each of a plurality of dies several of said preformed parts to form said preformed parts into links, then feeding said dies and links, while maintaining their spaced relation, into position to receive secondary sets of preformed parts formed in a preceding step, and forcing said secondary sets of preformed parts into other cavities of said dies suitably spaced to cause each of said secondary sets of parts to interlink, while being formed, with a link of said first mentioned set of links, then feeding said dies with said groups of interlinking links in their relative positions of original formation until said dies present said groups of links in further positions suitable to receive further sets of preformed parts so placed as to complete the connection of the groups of links, thus completing the chains, then feeding said completed chains successively to welding mechanism, then discharging said completed and welded chains.

21. In the process of making concurrently a plurality of chains, the steps which comprise severing from each of a plurality of stock wires a part suitable in length to serve as a blank for one link in one of said chains, bending said severed parts simultaneously to impart thereto a predetermined preliminary form, then forcing into spaced cavities of each of a plurality of dies several of said preformed parts to form said preformed parts into links, then feeding said dies and links, while maintaining their spaced relation, into position to receive secondary sets of preformed parts formed in a preceding step, and forcing said secondary sets of preformed parts into other cavities of said dies suitably spaced to cause each of said secondary sets of parts to interlink, while being formed, with a link of said first mentioned set of links, then feeding said dies with said interlinking links in their relative positions of original formation until said dies present said groups of links in further positions suitable to receive further sets of preformed parts so placed as to complete the connection of the groups of links, thus completing the chains; then feeding said completed chains successively into position for transfer to welding mechanism comprising a series of welding units, and transferring and feeding said chains successively to said welding units in succession, each welding unit acting to weld a component link occupying a predetermined serial position in each chain, all of the links of each chain having been welded when each chain has traversed all the welding units, then discharging said completed and welded chains.

22. In the process of making a chain, the steps which comprise straightening a plurality of stock wires, then severing from each stock wire a part suitable in length to serve as a blank for one link in said chain, bending said severed parts simultaneously to form each into a staple, then forcing several of said staples simultaneously into spaced cavities of a die to form said staples into links, then feeding said die and links, while maintaining their spaced relation, into position to receive a secondary set of staples comprising others of said staples formed in a preceding step, and forcing said secondary staples into other cavities of said die suitably spaced to cause said secondary set of staple to link with said first mentioned set of links while being formed, then feeding said die with said primary and secondary groups of links in positions of original formation until said die presents said primary and secondary groups of links in a third position suitable to receive a final group of staples so placed as to complete the connection of the primary and secondary groups of links, thus completing the chains; then feeding said completed chain into position for transferring to welding mechanism, and transferring and feeding said chain to several welding units in succession, each welding unit acting to perform a welding operation upon a component link occupying a predetermined serial position in said chain, all of the links of said chain being welded when said chain has traversed all the welding units, and then discharging said completed and welded cross-chain.

23. In a machine for making twisted chain links of the type composed of a length of wire having its ends bent toward its central portion, said wire being formed into loops at each side of said central portion, means to bend each of said lengths of wire into the form of a staple, a die having adjacent cavities arranged in angular positions adapted to bend the legs of said staple respectively around to form said loops, and means to force said staples into said cavities to form a twisted link, said leg-bending operations being accomplished by a direct thrust of said staple along its major axis.

24. In a machine for fabricating a chain of the type including twisted links each composed of a length of wire having its ends bent toward its central portion, said wire being formed into loops at each side of said central portion, means to bend each of said lengths of wire into the form of a staple, a die having adjacent cavities arranged in angular positions adapted to bend the legs of said staples respectively around to form said loops, and means to force a plurality of said staples simultaneously into spaced cavities of said die to form a plurality of segregated twisted links.

25. In a machine for fabricating a chain of the type including links each composed of a length of wire having its ends bent toward its central portion, said wire being formed into loops at each side of said central portion, means to bend each of said lengths of wire into the form of a staple, a die having adjacent cavities adapted to bend the legs of said staples respectively around to form said loops, and means to force a plurality of said staples simultaneously into spaced cavities of said die to form a plurality of segregated links, and means to form an interlinking link connected with one of said segregated links.

26. In a machine for fabricating a chain of the type including links each composed of a length of wire having its ends bent toward its central portion, said wire being formed into loops at each side of said central portion, means to bend each of said lengths of wire into the form of a staple, a die having adjacent cavities adapted to bend the legs of said staples respectively around to form said loops, and means to force a plurality of said staples simultaneously into spaced cavities of said die to form at least two segregated links, means to form a plurality of links each interlinking with one of said segregated links to form a plurality of groups of interlinking links, and means to form a link interlinking with and connecting said groups.

27. In a machine for fabricating a chain of the type including links each composed of a length of wire having its ends bent toward its central portion, said wire being formed into loops at each side of said central portion, means to bend each of said lengths of wire into the form of a staple, a die having adjacent cavities adapted to bend the legs of said staples respectively around to form said loops, and means to force a plurality of said staples simultaneously into spaced cavities of said die to form at least three segregated links, and means to form a plurality of links interlinking with and connecting said segregated links.

28. In a machine for fabricating a chain of the type including links each composed of a length of wire having its ends bent toward its central portion, said wire being formed into loops at each side of said central portion, means to bend each of said lengths of wire into the form of a staple, a die having adjacent cavities adapted to bend the legs of said staples respectively around to form said loops, and means to force a plurality of said staples simultaneously into spaced cavities of said die to form at least three segregated links, and means to form a plurality of links each interlinking with one of said segregated links to form segregated groups of links, and means to form a plurality of links each interlinking with links in two of said groups and connecting said groups.

29. In a machine for fabricating a chain of the type including links each composed of a length of wire having its ends bent toward its central portion, said wire being formed into loops at each side of said central portion, means to bend each of said lengths of wire into the form of a staple, a die having adjacent cavities adapted to bend the legs of said staples respectively around to form said loops, and means to force a plurality of said staples simultaneously into spaced cavities of said die to form at least three segregated links, and means to form a plurality of links each interlinking with one of said segregated links to form segregated groups of links, and means to form a plurality of links each interlinking with links in two of said groups and connecting said groups, thereby forming a chain of seven interlinked links.

30. In a machine for fabricating a chain of the type including links each composed of a length of wire having its ends bent toward its central portion, said wire being formed into loops at each side of said central portion, means to bend each of said lengths of wire into the form of a staple, a die having adjacent cavities adapted to bend the legs of said staples respectively around to form said loops, and means to force a plurality of said staples simultaneously into spaced cavities of said die to form at least three segregated links, and means to form a plurality of links each interlinking with one of said segregated links to form segregated groups of links, and means to form a plurality of links each interlinking with links in two of said groups and connecting said groups, thereby forming a chain of seven interlinked links, said complete chain being formed by three successive strokes of said forming means.

31. A die for use in making a twisted link of the type including a length of wire having its ends bent toward its central portion, said die having adjacent cavities arranged in angular positions adapted to bend each end of said wire into the form of an open loop with said ends adjacent to each other and to said central portion, said loops forming a twisted link.

32. A die for use in making a link of the type including a length of wire having its ends bent toward its central portion, said die having adjacent cavities adapted to bend each end of said wire into the form of an open loop with said ends adjacent to each other and to said central portion, said ends crossing each other.

33. A die for use in making a link of the type including a length of wire having its ends bent toward its central portion, said die having adjacent cavities adapted to bend each end of said wire into the form of an open loop with said ends adjacent to each other and to said central portion, said ends crossing each other and each end extending into the loop formed by the other end.

34. A die for use in making a twisted link of the type including a length of wire having its ends bent toward its central portion, said die having adjacent cavities of arcuate form, said cavities being arranged in staggered opposed relation, with an end of one cavity disposed near the middle of the arc occupied by said adjacent cavity.

35. A die for use in making a chain of the type including twisted links each composed of a length of wire having its ends bent toward its central portion, forming loops at each side of said central portion, said die having two adjacent series of arcuate cavities, the cavities of one series being staggered relatively to the cavities of the other series, with adjacent ends of the cavities in one series disposed near the middle of the arcs occupied by opposite cavities in the other series.

36. A die for use in making a chain of the type including twisted links each composed of a length of wire having its ends bent toward its central portion, forming loops at each side of said central portion, said die having two adjacent series of arcuate cavities, the cavities of one series being staggered relatively to the cavities of the other series, with adjacent ends of the cavities in one series disposed near the middle of the arcs occupied by opposite cavities in the other series whereby, when a plurality of said lengths of wire are forced into said cavities, an end loop of one length of wire is formed into a loop interlinking with an end loop of an adjacent link.

37. In a machine for fabricating chains, means for simultaneously forming a plurality of twisted links in spaced relation, and means for forming a twisted link in interlinking relation with said spaced links, connecting the same.

38. In a machine for fabricating chains, means for simultaneously forming a plurality of twisted links in spaced relation, and means for forming a twisted link in interlinking relation with said spaced links, connecting the same, to constitute a complete section of chain.

39. In a machine for fabricating chains, means for simultaneously forming a plurality of twisted links in spaced relation, and means for forming a twisted link in interlinking relation with said spaced links, connecting the same, to constitute a complete section of chain, by a series of strokes less than the total number of links.

40. In a machine for fabricating chains, means for simultaneously forming at least three segregated links, means for simultaneously forming at least two links in interlinking relation with two of said primary links, and means for simultaneously forming at least two links in interlinking relation with said primary and secondary sets of links, thereby to form a complete section of chain comprising at least seven links, in three successive strokes.

41. In a machine for making chains, means for straightening a plurality of wires, means for severing from each stock wire a part suitable in length to serve as a blank for one link in said chain, means for bending said severed parts simultaneously to form each into a staple, means for forcing several of said staples into spaced cavities of a die to form said staples into links, means for feeding said die and links, while maintaining their spaced relation, into position to receive a second set of staples formed in a preceding operation and means for forcing said second set of staples into cavities of said die suitably spaced to cause said second set of staples to interlink with links of said first mentioned group while being formed.

42. In a machine for making chains, means for straightening a plurality of wires, means for severing from each stock wire a part suitable in length to serve as a blank for one link in said chain, means for bending said severed parts simultaneously to form each into a staple, means for forcing several of said staples into spaced cavities of a die to form said staples into links, means for feeding said die and links, while maintaining their spaced relation, into position to receive a second set of staples formed in a preceding operation and means for forcing said second set of staples into cavities of said die suitably spaced to cause said second set of staples to interlink with links of said first mentioned group while being formed, said feeding means serving for feeding said die with said primary and secondary sets of links in positions of original formation until said die presents said primary and secondary sets of links in a third position suitable to receive a final set of staples so placed as to complete the connection of the primary and secondary sets of links, thus completing the chain.

43. In a machine for making chains, means for straightening a plurality of wires, means for severing from each stock wire a part suitable in length to serve as a blank for one link in said chain, means for bending said severed parts simultaneously to form each into a staple, means for forcing several of said staples into spaced cavities of a die to form said staples into links, means for feeding said die and links, while maintaining their spaced relation, into position to receive a second set of staples formed in a preceding operation and means for forcing said second set of staples into cavities of said die suitably spaced to cause said second set of staples to interlink with links of said first mentioned group while being formed, and means for feeding said die with said primary and secondary sets of links in positions of original formation until said die presents said primary and secondary sets of links in a third position suitable to receive a final set of staples so placed as to complete the connection of the primary and secondary sets of links, thus completing the chain; said feeding means serving for feeding said completed cross-chain into position for transfer to welding mechanism, comprising a plurality of welding units, and means for transferring and feeding said chain to said welding units in succession, each welding unit acting to perform a welding operation upon a component link of the chain, all of the links of said chain being welded when said chain has traversed all of the welding units, and means for discharging said completed and welded chain.

44. In a machine for making concurrently a plurality of chains, means for severing from each of a plurality of stock wires a part suitable in length to serve as a blank for one link in one of said chains, means for bending said severed parts simultaneously to impart thereto a predetermined preliminary form, means for forcing several of said preformed parts into spaced cavities of a die to form said preformed parts into links, means for feeding said die and links, while maintaining their spaced relation, into position to receive a secondary set of preformed parts formed in a preceding step, means for forcing said secondary set of preformed parts into other cavities of said die suitably spaced to cause each of said secondary set of parts to interlink, while being formed, with a link of said first mentioned set of links, said feeding means serving for feeding said die with said groups of interlinking links in their relative positions of original formation until said die presents said groups of links in a further position suitable to receive a further set of preformed parts so placed as to complete the connection of the groups of links, thus completing the chains.

45. In a machine for making concurrently a plurality of chains, means for severing from each of a plurality of stock wires a part suitable in length to serve as a blank for one link in one of said chains, means for bending said severed parts simultaneously to impart thereto a predetermined preliminary form, means for forcing several of said preformed parts into spaced cavities of a die to form said preformed parts into links, means for feeding said die and links, while maintaining their spaced relation, into position to receive a secondary set of preformed parts formed in a preceding step, means for forcing said secondary set of preformed parts into other cavities of said die suitably spaced to cause each of said secondary set of parts to interlink, while being formed, with a link of said first mentioned set of links, said feeding means serving for feeding said die with said groups of interlinking links in their relative positions of original formation until said die presents said groups of links in a further position suitable to receive a further set of preformed parts so placed as to complete the connection of the groups of links, thus completing the chains; means for feeding said completed chains successively into position for transfer to welding mechanism comprising a plurality of units, and means for transferring and feeding said chains successively to said welding units in succession, each welding unit acting to weld a component link occupying a predetermined serial position in each chain, all of the links of each chain having been welded when each chain has traversed all the welding units, and means for discharging said completed and welded chains.

46. In a machine for fabricating concurrently a plurality of chains, means for severing from each of a plurality of stock wires a part suitable in length to serve as a blank for one link in one of said chains, means for bending said severed parts simultaneously to impart thereto a predetermined preliminary form, means for forcing several of said preformed parts into spaced cavities of a plurality of dies to form said preformed parts into links, means for feeding said dies and links, while maintaining their spaced relation, into position to receive secondary sets of said preformed parts formed in a preceding step, means for forcing said secondary sets of preformed parts into other cavities of said dies suitably spaced to cause each of said secondary set of parts to interlink, while being formed, with a link of said first mentioned set of links, to constitute groups of links.

47. In a machine for fabricating concurrently a plurality of chains, means for severing from each of a plurality of stock wires a part suitable in length to serve as a blank for one link in one of said chains, means for bending said severed parts simultaneously to impart thereto a predetermined preliminary form, means for forcing several of said preformed parts into spaced cavities of a plurality of dies to form said preformed parts into links, means for feeding said dies and links, while maintaining their spaced relation, into position to receive secondary sets of said preformed parts formed in a preceding step, means for forcing said secondary sets of preformed parts into other cavities of said dies suitably spaced to cause each of said secondary set of parts to interlink, while being formed, with a link of said first mentioned set of links, to constitute groups of links, said feeding means serving for feeding said dies with said groups of interlinking links in their relative positions of original formation until said dies present said groups of links in a further position suitable to receive a further set of preformed parts so placed as to complete the connection of the groups of links, thus completing the chains.

48. In a machine for fabricating concurrently a plurality of chains, means for severing from each of a plurality of stock wires a part suitable in length to serve as a blank for one link in one of said chains, means for bending said severed parts simultaneously to impart thereto a predetermined preliminary form, means for forcing several of said preformed parts into spaced cavities of a plurality of dies to form said preformed parts into links, means for feeding said dies and links, while maintaining their spaced relation, into position to receive secondary sets of said preformed parts formed in a preceding step, means for forcing said secondary sets of preformed parts into other cavities of said dies suitably spaced to cause each of said secondary set of parts to interlink, while being formed, with a link of said first mentioned set of links, to constitute groups of links, said feeding means serving for feeding said dies with said groups of interlinking links in their relative positions of original formation until said dies present said groups of links in a further position suitable to receive a further set of preformed parts so placed as to complete the connection of the groups of links, thus completing the chains, and means for feeding said completed chains successively into position for transfer to welding mechanism, comprising a plurality of units and means for transferring and feeding said chains successively to said welding units in succession, each welding unit acting to weld a component link occupying a predetermined serial position in each chain, all of the links of each chain having been welded when each chain has traversed all the welding units, then discharging said completed and welded chains.

In testimony whereof, I have signed this specification.

CHARLES M. LAMB.